United States Patent
Ma et al.

(10) Patent No.: US 12,096,490 B2
(45) Date of Patent: Sep. 17, 2024

(54) COVERAGE ENHANCEMENT AND CONFIGURATION FOR TWO-STEP RACH IN NON-TERRESTRIAL NETWORKS

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Peter Gaal, San Diego, CA (US); Ayan Sengupta, San Diego, CA (US); Jun Ma, San Diego, CA (US); Bharat Shrestha, San Diego, CA (US); Changhwan Park, San Diego, CA (US); Umesh Phuyal, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/651,206

(22) Filed: Feb. 15, 2022

(65) Prior Publication Data
US 2022/0361254 A1   Nov. 10, 2022

Related U.S. Application Data

(60) Provisional application No. 63/201,683, filed on May 7, 2021.

(51) Int. Cl.
*H04W 74/0833* (2024.01)
*H04L 5/00* (2006.01)
(Continued)

(52) U.S. Cl.
CPC ....... *H04W 74/0841* (2013.01); *H04L 5/0012* (2013.01); *H04W 72/0446* (2013.01); *H04W 74/008* (2013.01); *H04W 74/0866* (2013.01)

(58) Field of Classification Search
CPC ......... H04W 74/0841; H04W 72/0446; H04W 74/008; H04W 74/0866; H04W 72/23;
(Continued)

(56) References Cited

U.S. PATENT DOCUMENTS

2020/0059961 A1*   2/2020   Do .................... H04W 74/0808
2020/0267774 A1*   8/2020   Vos ................... H04W 74/0833
(Continued)

FOREIGN PATENT DOCUMENTS

WO   2020/237573 A1   12/2020

OTHER PUBLICATIONS

International Search Report and Written Opinion dated Jul. 4, 2022 from corresponding PCT Application No. PCT/US2022/071799.
(Continued)

*Primary Examiner* — Chae S Lee
(74) *Attorney, Agent, or Firm* — ArentFox Schiff LLP

(57) ABSTRACT

Aspects are provided which allow coverage enhancement and support in NTNs for repetition, frequency hopping, and antenna switching during msgA transmissions based on a preamble-to-PO mapping. In one aspect, the base station provides and the UE obtains a RACH configuration associating a preamble with at least one PO for two-step random access, where the PO spans a time interval greater than one slot. In another aspect, the base station provides and the UE obtains a RACH configuration associating a preamble with a plurality of POs for two-step random access. In a further aspect, the base station provides the UE a plurality of configurations each indicating a PO for two-step random access. In an additional aspect, the base station provides the UE a configuration indicating a guard band for a PO for two-step random access, where the guard band is indicated in units of subcarriers spanning less than one PRB.

28 Claims, 23 Drawing Sheets

(51) Int. Cl.
　　　*H04W 72/0446*　　(2023.01)
　　　*H04W 74/00*　　　(2009.01)
　　　*H04W 74/08*　　　(2024.01)

(58) Field of Classification Search
　　　CPC ............ H04W 74/0833; H04W 74/006; H04L
　　　　　　　5/0012; H04L 25/0224; H04L 5/0044;
　　　　　　　H04L 5/0048; H04L 5/0082; H04L
　　　　　　　5/0091; H04L 27/2601; H04L 5/001;
　　　　　　　H04L 5/0023; H04L 1/08
　　　See application file for complete search history.

(56) References Cited

U.S. PATENT DOCUMENTS

| | | | | |
|---|---|---|---|---|
| 2021/0112600 | A1 | 4/2021 | Jing et al. | |
| 2022/0132595 | A1* | 4/2022 | Ko | H04W 74/008 |
| 2023/0015550 | A1* | 1/2023 | Lin | H04B 1/7143 |
| 2023/0069881 | A1* | 3/2023 | Rastegardoost | H04L 5/0051 |
| 2023/0292376 | A1* | 9/2023 | Agiwal | H04L 5/0048 |

OTHER PUBLICATIONS

ZTE: "Feature Lead Summary #3 of 7.2.1.1 Two-step RACH Channel Structure", 3GPP Draft; R1-1907903 Feature Lead Summary #3 For 2-STEP Rach Channel Structure, 3rd Generation Partnership Project (3GPP), Mobile Competence Centre; 650, Route Des Lucioles; F-06921 Sophia-Antipolis vol. RAN WG1 No. Reno, USA; May 13, 2019-May 17, 2019 May 20, 2019 (May 20, 2019), XP051740162, Retrieved from the Internet: URL: http://www.3gpp.org/ftp/tsg%5Fran/WG1%5FRL1/TSGR1%5F97/Docs/R1%2D1907903%2Ezip [retrieved on May 20, 2018] paragraph [0002]; table 1.

ZTE: "FL Summary #2 of Channel Structure for 2-step RACH", 3GPP Draft; R1-1911448 FL Summary #2 Of Channel Structure for 2-Step RACH, 3rd Generation Partnership Project (3GPP), Mobile Competence Centre; 650, Route Des Lucioles; F-06921 Sophia-Antipolis Cedex vol. RAN WG1, No. Chongqing, China; Oct. 14, 2019-Oct. 20, 2019 Oct. 22, 2019 (Oct. 22, 2019), XP051798714, Retrieved from the Internet: URL: https://ftp.3gpp.org/tsg_ran/WG1_RL1/TSGR1_98b/Docs/R1-1911448.zip R1-1911448 FL Summary #2 of Channel Structure for 2-step RACH.docx [retrieved on Oct. 22, 2019] paragraph [02.I]-paragraph [2.1.3].

Ericsson: "Channel Structure for Two-Step RACH", 3GPP Draft; R1-1909122 Channel Structure for Two-Step RACH, 3rd Generation Partnership Project (3GPP), Mobile Competence Centre; 650, Route Des Lucioles; F-06921 Sophia-Antipolis Cedex; France vol. RAN WG1, No. Prague, CZ; Aug. 26, 2019-Aug. 30, 2019 Aug. 17, 2019 (Aug. 17, 2019), XP051765725, Retrieved from the Internet: URL: http://www.3gpp.org/ftp/tsg_ran/WG1_RL1/TSGR1_98/Docs/R1-1909122.zip [retrieved on Aug. 17, 2019] paragraph [0002].

Oppo: "On Channel Structure for 2-step RACH", 3GPP Draft; R1-1905051, 3rd Generation Partnership Project (3GPP), Mobile Competence Centre; 650, Route Des Lucioles; F-06921 Sophia-Antipolis Cedex ; France vol. RAN WG1, No. Xi'an, China; Apr. 8, 2019-Apr. 12, 2019 Apr. 7, 2019 (Apr. 7, 2019), XP051700150, Retrieved from the Internet: URL: http://www.3gpp.org/ftp/Meetings%5F3GPP%5FSYNC/RAN1/Docs/R1%PD1905051%2Ezip [retrieved on Apr. 7, 2019] paragraph [0003]-paragraph [0004].

Panasonic: "Discussion on Type A PUSCH repetitions for Msg.3", 3GPP Draft; RI-2103209, 3rd Generation Partnership Project (3GPP), Mobile Competence Centre; 650, Route Des Lucioles; F-06921 Sophia-Antipolis Cedex ; France vol. RAN WG1, No. e-Meeting; Apr. 12, 2021-Apr. 20, 2021 Apr. 6, 2021 (Apr. 6, 2021), XP051993363, Retrieved from the Internet: URL: https://ftp.3gpp.org/tsg_ran/WG1_RL1/TSGR1_104b-e/Docs/RI-2103209.zip RI-2103209.docx [retrieved on Apr. 6, 2021] paragraph [0002].

ZTE et al: "On the remaining issues of msgA channel structure", 3GPP Draft; R1-1908181 On the Remaining Issues of Msga Channel Structure, 3rd Generation Partnership Project (3GPP), Mobile Competence Centre; 650, Route Des Lucioles; F-06921 Sophia-Antipolis Cedex vol. Ran WG1, No. Prague, CZ; Aug. 26, 2019-Aug. 30, 2019 Aug. 16, 2019 (Aug. 16, 2019), XP051764800, Retrieved from the Internet: URL: http://www.3gpp.org/ftp/tsg_ran/WG1_RL1/TSGR1_98/Docs/RI-1908181.zip [retrieved on Aug. 16, 2019] paragraph [0002]-paragraph [0003].

* cited by examiner

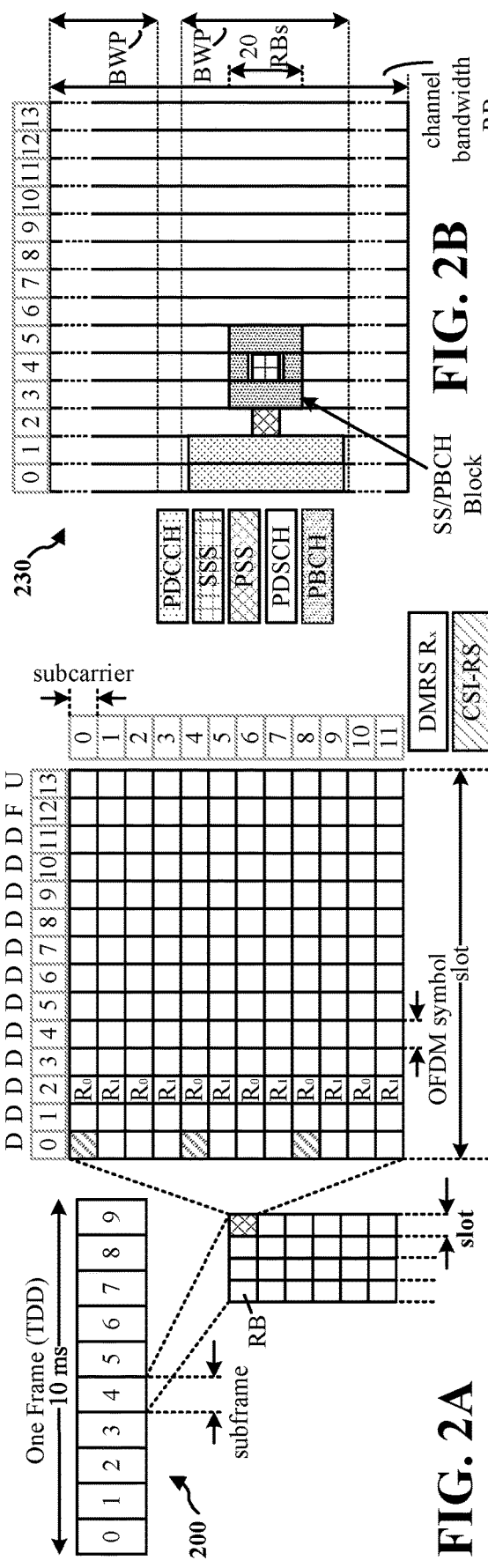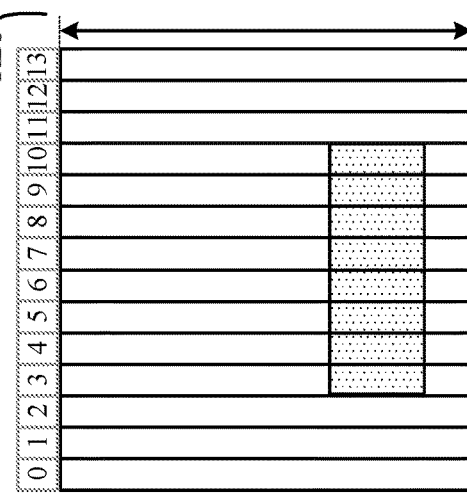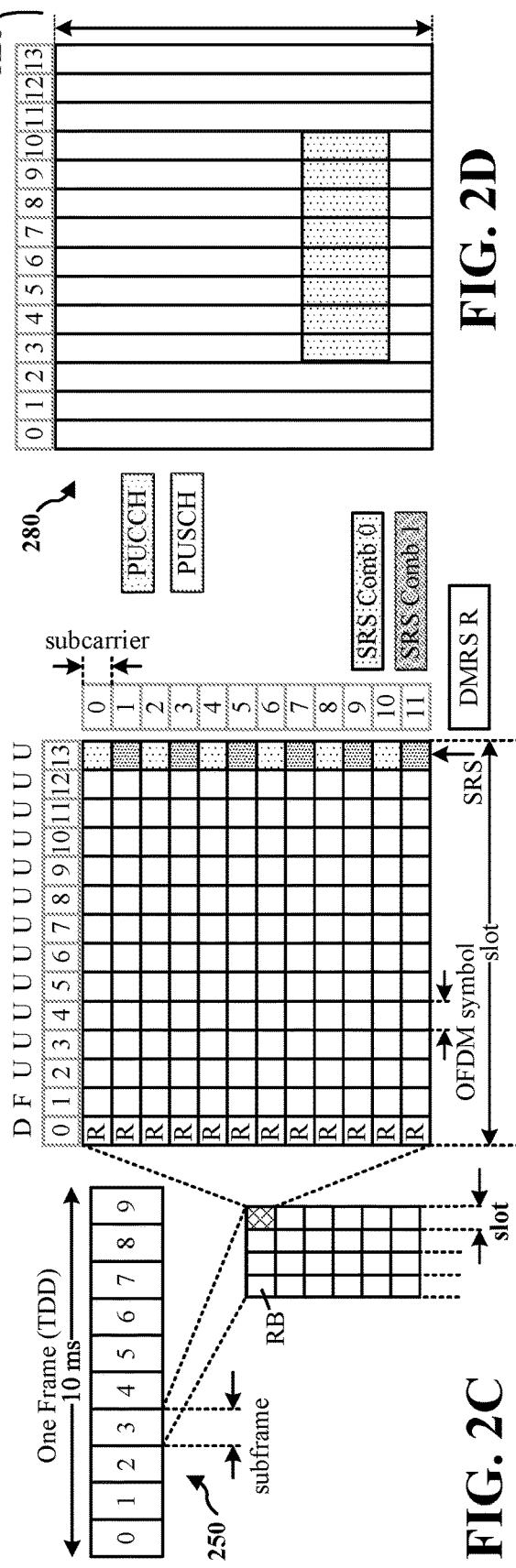
FIG. 2A
FIG. 2B
FIG. 2C
FIG. 2D

COVERAGE ENHANCEMENT AND CONFIGURATION FOR TWO-STEP RACH IN NON-TERRESTRIAL NETWORKS

CROSS REFERENCE TO RELATED APPLICATION(S)

This application claims the benefit of U.S. Provisional Application Ser. No. 63/201,683, entitled "COVERAGE ENHANCEMENT AND CONFIGURATION FOR TWO-STEP RACH IN NON-TERRESTRIAL NETWORKS" and filed on May 7, 2021, the disclosure of which is expressly incorporated by reference herein in its entirety.

BACKGROUND

Technical Field

The present disclosure generally relates to communication systems, and more particularly, to a wireless communication system between a base station and a user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE obtains a random access channel (RACH) configuration, where the RACH configuration associates a preamble with at least one physical uplink shared channel (PUSCH) occasion (PO) for two-step random access, and where the PO spans a time interval greater than one slot.

In an aspect of the disclosure, a method, a computer-readable medium, and an apparatus are provided. The apparatus may be a UE. The UE obtains a RACH configuration, where the RACH configuration associates a preamble with a plurality of POs for two-step random access.

In an aspect of the disclosure, a method, a computer-readable medium, and an apparatus are provided. The apparatus may be a UE. The UE obtains a plurality of configurations each indicating a PO for two-step random access.

In an aspect of the disclosure, a method, a computer-readable medium, and an apparatus are provided. The apparatus may be a UE. The UE obtains a configuration indicating a guard band for a PO for two-step random access, where the guard band is indicated in units of subcarriers spanning less than one physical resource block (PRB).

In an aspect of the disclosure, a method, a computer-readable medium, and an apparatus are provided. The apparatus may be a base station. The base station provides a RACH configuration, where the RACH configuration associates a preamble with at least one PO for two-step random access, and where the PO spans a time interval greater than one slot.

In an aspect of the disclosure, a method, a computer-readable medium, and an apparatus are provided. The apparatus may be a base station. The base station provides a RACH configuration, where the RACH configuration associates a preamble with a plurality of POs for two-step random access.

In an aspect of the disclosure, a method, a computer-readable medium, and an apparatus are provided. The apparatus may be a base station. The base station provides a plurality of configurations each indicating a PO for two-step random access.

In an aspect of the disclosure, a method, a computer-readable medium, and an apparatus are provided. The apparatus may be a base station. The base station provides a configuration indicating a guard band for a PO for two-step random access, where the guard band is indicated in units of subcarriers spanning less than one PRB.

Certain aspects of the disclosure relate to an apparatus for wireless communications. The apparatus may include a memory comprising instructions, and one or more processors configured to execute the instructions. The one or more processors may cause the apparatus to obtain a random access channel (RACH) configuration, wherein the RACH configuration associates a preamble with at least one physical uplink shared channel (PUSCH) occasion (PO) for two-step random access, and wherein the PO spans a time interval greater than one slot. The one or more processors may cause the apparatus to output repetitions of PUSCH data for transmission in the at least one PO.

Certain aspects of the disclosure relate to an apparatus for wireless communications. The apparatus may include a memory comprising instructions and one or more processors configured to execute the instructions. The one or more processors may cause the apparatus to obtain a random access channel (RACH) configuration, wherein the RACH configuration associates a preamble with a plurality of physical uplink shared channel (PUSCH) occasions (POs) for two-step random access. The one or more processors may cause the apparatus to output repetitions of PUSCH data for transmission in at least one of the plurality of POs.

Certain aspects of the disclosure relate to an apparatus for wireless communications. The apparatus may include a memory comprising instructions and one or more processors configured to execute the instructions. The one or more processors may cause the apparatus to output a random access channel (RACH) configuration for transmission, wherein the RACH configuration associates a preamble with at least one physical uplink shared channel (PUSCH) occasion (PO) for two-step random access, and wherein the PO spans a time interval greater than one slot. The one or more processors may cause the apparatus to obtain repetitions of PUSCH data in the at least one PO.

Certain aspects of the disclosure relate to an apparatus for wireless communications. The apparatus may include a memory comprising instructions and one or more processors configured to execute the instructions. The one or more processors may cause the apparatus to output a random access channel (RACH) configuration for transmission, wherein the RACH configuration associates a preamble with a plurality of physical uplink shared channel (PUSCH) occasions (POs) for two-step random access. The one or more processors may cause the apparatus to obtain repetitions of PUSCH data in at least one of the plurality of POs.

Certain aspects of the disclosure relate to a method for wireless communications at a user equipment (UE). In some examples, the method includes obtaining a random access channel (RACH) configuration, wherein the RACH configuration associates a preamble with at least one physical uplink shared channel (PUSCH) occasion (PO) for two-step random access, and wherein the PO spans a time interval greater than one slot. In some examples, the method includes outputting repetitions of PUSCH data for transmission in the at least one PO.

Certain aspects of the disclosure relate to a method for wireless communications at a user equipment (UE). In some examples, the method includes obtaining a random access channel (RACH) configuration, wherein the RACH configuration associates a preamble with a plurality of physical uplink shared channel (PUSCH) occasions (POs) for two-step random access. In some examples, the method includes outputting repetitions of PUSCH data for transmission in at least one of the plurality of POs.

Certain aspects of the disclosure relate to a method for wireless communications at a base station (BS). In some examples, the method includes outputting a random access channel (RACH) configuration for transmission, wherein the RACH configuration associates a preamble with at least one physical uplink shared channel (PUSCH) occasion (PO) for two-step random access, and wherein the PO spans a time interval greater than one slot. In some examples, the method includes obtaining repetitions of PUSCH data in the at least one PO.

Certain aspects of the disclosure relate to a method for wireless communications at a base station (BS). In some examples, the method includes outputting a random access channel (RACH) configuration for transmission, wherein the RACH configuration associates a preamble with a plurality of physical uplink shared channel (PUSCH) occasions (POs) for two-step random access. In some examples, the method includes obtaining repetitions of PUSCH data in at least one of the plurality of POs.

Certain aspects of the disclosure relate to an apparatus for wireless communications. In some examples, the apparatus includes means for obtaining a random access channel (RACH) configuration, wherein the RACH configuration associates a preamble with at least one physical uplink shared channel (PUSCH) occasion (PO) for two-step random access, and wherein the PO spans a time interval greater than one slot. In some examples, the apparatus includes means for includes outputting repetitions of PUSCH data for transmission in the at least one PO.

Certain aspects of the disclosure relate to an apparatus for wireless communications. In some examples, the apparatus includes means for obtaining a random access channel (RACH) configuration, wherein the RACH configuration associates a preamble with a plurality of physical uplink shared channel (PUSCH) occasions (POs) for two-step random access. In some examples, the apparatus includes means for outputting repetitions of PUSCH data for transmission in at least one of the plurality of POs.

Certain aspects of the disclosure relate to an apparatus for wireless communications. In some examples, the apparatus includes means for outputting a random access channel (RACH) configuration for transmission, wherein the RACH configuration associates a preamble with at least one physical uplink shared channel (PUSCH) occasion (PO) for two-step random access, and wherein the PO spans a time interval greater than one slot. In some examples, the apparatus includes means for obtaining repetitions of PUSCH data in the at least one PO.

Certain aspects of the disclosure relate to an apparatus for wireless communications. In some examples, the apparatus includes means for outputting a random access channel (RACH) configuration for transmission, wherein the RACH configuration associates a preamble with a plurality of physical uplink shared channel (PUSCH) occasions (POs) for two-step random access. In some examples, the apparatus includes means for obtaining repetitions of PUSCH data in at least one of the plurality of POs.

Certain aspects of the disclosure relate to a non-transitory computer-readable medium having instructions stored thereon that, when executed by an apparatus, cause the apparatus to perform operations. In some examples, the operations include obtaining a random access channel (RACH) configuration, wherein the RACH configuration associates a preamble with at least one physical uplink shared channel (PUSCH) occasion (PO) for two-step random access, and wherein the PO spans a time interval greater than one slot. In some examples, the operations include outputting repetitions of PUSCH data for transmission in the at least one PO.

Certain aspects of the disclosure relate to a non-transitory computer-readable medium having instructions stored thereon that, when executed by an apparatus, cause the apparatus to perform operations. In some examples, the operations include obtaining a random access channel (RACH) configuration, wherein the RACH configuration associates a preamble with a plurality of physical uplink shared channel (PUSCH) occasions (POs) for two-step random access. In some examples, the operations include outputting repetitions of PUSCH data for transmission in at least one of the plurality of POs.

Certain aspects of the disclosure relate to a non-transitory computer-readable medium having instructions stored thereon that, when executed by an apparatus, cause the apparatus to perform operations. In some examples, the operations include outputting a random access channel (RACH) configuration for transmission, wherein the RACH configuration associates a preamble with at least one physical uplink shared channel (PUSCH) occasion (PO) for two-step random access, and wherein the PO spans a time interval greater than one slot. In some examples, the operations include obtaining repetitions of PUSCH data in the at least one PO.

Certain aspects of the disclosure relate to a non-transitory computer-readable medium having instructions stored thereon that, when executed by an apparatus, cause the apparatus to perform operations. In some examples, the operations include outputting a random access channel (RACH) configuration for transmission, wherein the RACH configuration associates a preamble with a plurality of physical uplink shared channel (PUSCH) occasions (POs) for two-step random access. In some examples, the operations include obtaining repetitions of PUSCH data in at least one of the plurality of POs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
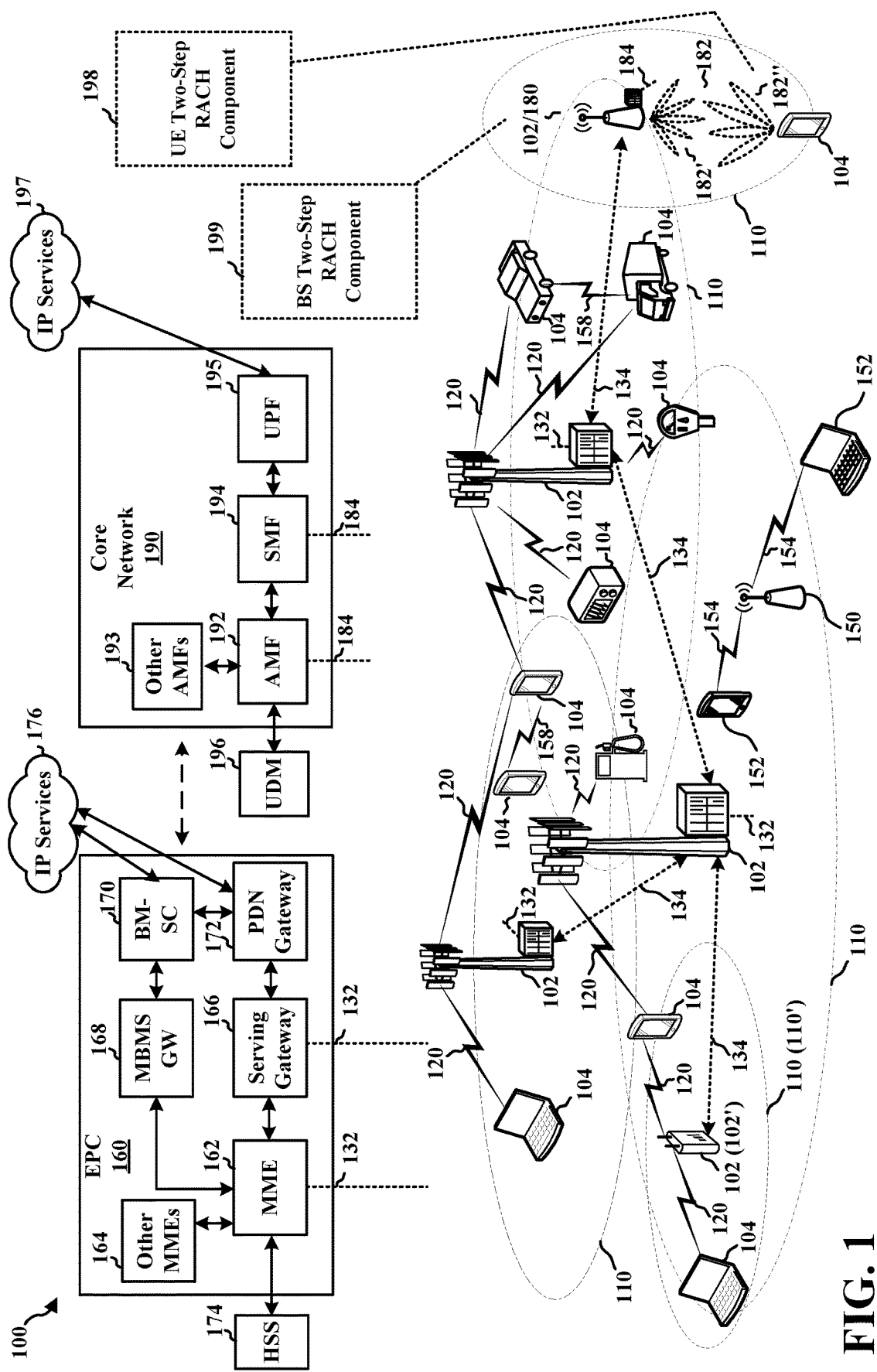
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

UEs and base stations may be part of a non-terrestrial network (NTN). A NTN is a network involving non-terrestrial flying objects (e.g., satellite communication networks, high altitude platform systems, air-to-ground networks, etc.). For instance, in a satellite communication network, a UE may transmit uplink data to and receive downlink data from a base station via an Earth orbiting satellite. The UE may be a very small aperture terminal (VSAT) with high transmit and receive antenna gains, or a handheld device.

Generally, in NTNs, a UE is assumed to include global navigation satellite system (GNSS) capabilities. Such capabilities allow the UE to obtain from its position, and from an ephemeris of the satellite linking to the base station, an accurate timing advance (TA). This TA allows for accurate received timing at the base station for random access messages (e.g., messages in four-step and two-step RACH procedures) as well as other data transmissions from the UE. The accuracy of the TA for random access (e.g., the common TA margin) may be within half of a cyclic prefix (CP).

In a four-step contention-based RACH procedure, four messages may be provided between a UE and a base station. For example, during an initial attach procedure, a UE may send a preamble to the base station (e.g. message 1), receive a random access response (RAR) from the base station (e.g. message 2), send an RRC Connection Request message or other payload to the base station (e.g. message 3), and receive an RRC Connection Setup message or other transmission subject to contention resolution from the base station (e.g. message 4). This four-step RACH procedure can be simplified into a two-step RACH procedure in which the UE sends a preamble and a payload in a first message. For example, message A ("msgA") of a two-step RACH procedure may correspond to messages 1 and 3 of the four-step RACH procedure, and message B ("msgB") may correspond to messages 2 and 4 of the four-step RACH procedure. Thus, in the two-step RACH procedure, the UE may send the preamble followed by the payload in a msgA transmission to the base station, while the base station may send the RAR and the RRC response message in a msgB transmission to the UE. In NTNs, the preamble, payload, RAR, and response message may be communicated between the UE and base station via a satellite or other non-terrestrial node.

Thus, two-step RACH procedures may significantly reduce latency in comparison to four-step RACH procedures by reducing the number of messages communicated between the UE and the base station. Such impact of reduced latency may particularly be felt in NTNs, where communication via a non-terrestrial node (e.g., a satellite) typically results in higher latencies than in other networks. However, high overhead may result from two-step RACH procedures in the event of msgA re-transmissions. For instance, if the base station fails to decode msgA PUSCH data (despite successfully decoding a msgA preamble), the base station may transmit a fallback RAR message in response to which the UE re-transmits the entire msgA again (including the preamble as well as PUSCH data). Similarly, if the UE fails to decode a success RAR message indicating that the base station successfully decoded the msgA PUSCH data, the UE may likewise retransmit the entire msgA. Thus, high overhead may result from conventional msgA re-transmissions regardless of whether RAR is successfully received or not by the base station. Furthermore, in the case of smart phone UEs, each retransmitted msgA may include PUSCH repetitions for coverage enhancement, further increasing the overhead. Additionally, two-step random access may be more limited than four-step random access (e.g., two-step RACH conventionally supports intra-slot PUSCH frequency hopping only).

Accordingly, it would be helpful to improve the efficiency of two-step RACH procedures by decoupling preamble repetitions from PUSCH repetitions in msgA and allowing for more flexible repetition schemes. It would also be helpful to allow demodulation reference signal (DMRS) bundling or frequency hopping (e.g., inter-slot) for msgA PUSCH data. Aspects of the present disclosure provide coverage enhancement and support (including in NTNs) for repetition, frequency hopping, and antenna switching during msgA transmissions based on a preamble-to-PO mapping.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNB s), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a UE two-step RACH component 198 that is configured to obtain a RACH configuration, where the RACH configuration associates a preamble with at least one PO for two-step random access, and where the PO spans a time interval greater than one slot. The component 198 may alternatively or additionally be configured to obtain a RACH configuration, where the RACH configuration associates a preamble with a plurality of POs for two-step random access. The component 198 may alternatively or additionally be configured to obtain a plurality of configurations each indicating a PO for two-step random access. The component 198 may alternatively or additionally be configured to obtain a configuration indicating a guard band for a PO for two-step random access, where the guard band is indicated in units of subcarriers spanning less than one PRB.

Referring again to FIG. 1, in certain aspects, the base station 102/180 may include a BS two-step RACH component 199 that is configured to provide a RACH configuration, where the RACH configuration associates a preamble with at least one PO for two-step random access, and where the PO spans a time interval greater than one slot. The component 199 may alternatively or additionally be configured to provide a RACH configuration, where the RACH configuration associates a preamble with a plurality of POs for two-step random access. The component 199 may alternatively or additionally be configured to provide a plurality of configurations each indicating a PO for two-step random access. The component 199 may alternatively or additionally be configured to provide a configuration indicating a guard band for a PO for two-step random access, where the guard band is indicated in units of subcarriers spanning less than one PRB.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
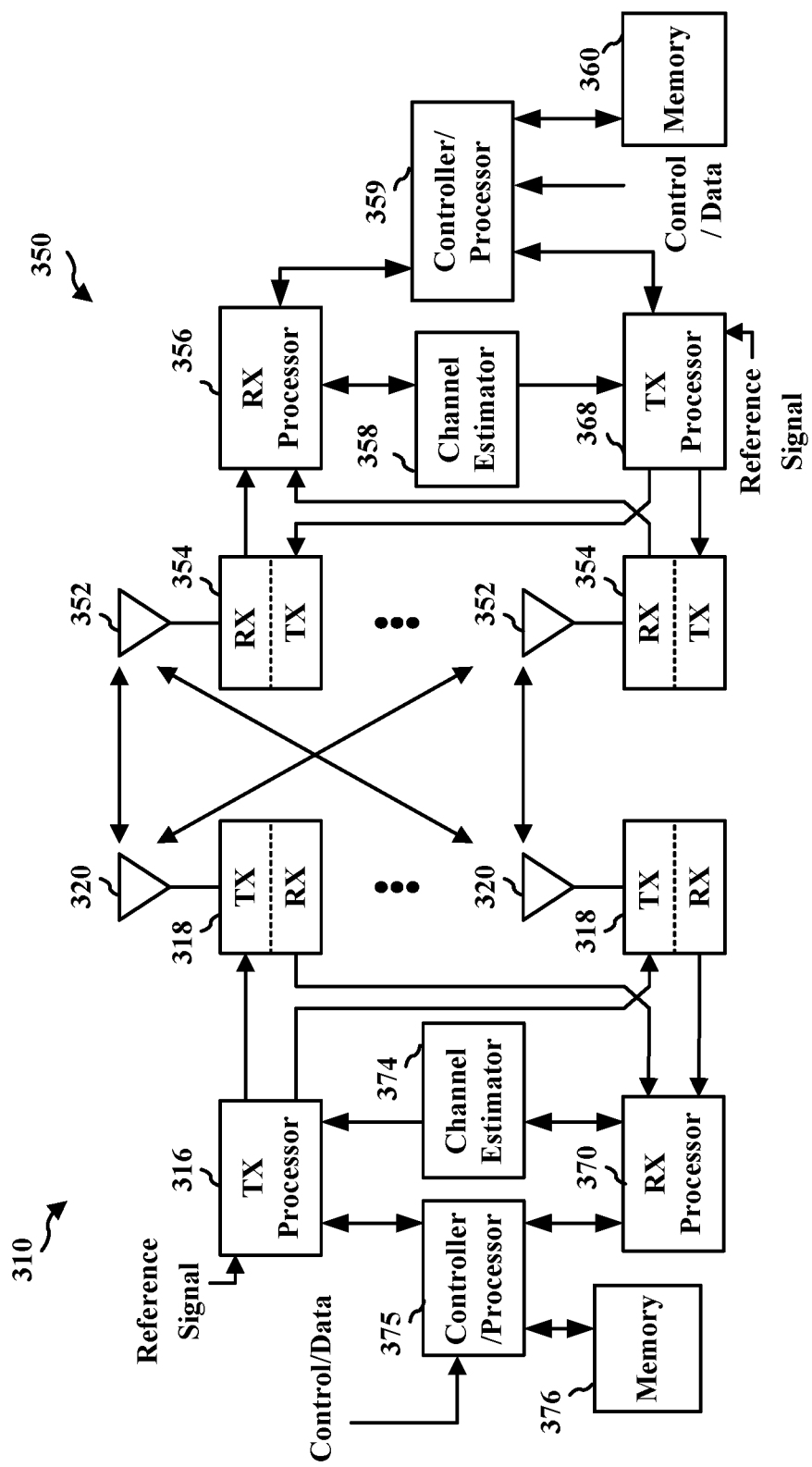
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE two-step RACH component 198 of FIG. 1.

At least one of the TX processor 316, the RX processor 370, and the controller/processor 375 may be configured to perform aspects in connection with BS two-step RACH component 199 of FIG. 1.

UEs and base stations may be part of a non-terrestrial network (NTN). A NTN is a network involving non-terrestrial flying objects (e.g., satellite communication networks, high altitude platform systems, air-to-ground networks, etc.). For instance, in a satellite communication network, a UE may transmit uplink data to and receive downlink data from a base station via an Earth orbiting satellite. The UE may be a very small aperture terminal (VSAT) with high transmit and receive antenna gains, or a handheld device.

Generally, in NTNs, a UE is assumed to include global navigation satellite system (GNSS) capabilities. Such capabilities allow the UE to obtain from its position, and from an ephemeris of the satellite linking to the base station, an accurate timing advance (TA). This TA allows for accurate received timing at the base station for random access messages (e.g., messages in four-step and two-step RACH procedures) as well as other data transmissions from the UE. The accuracy of the TA for random access (e.g., the common TA margin) may be within half of a cyclic prefix (CP). OFDM transmissions from multiple UEs may be aligned at the satellite or the base station and the orthogonality is maintained.

In a four-step contention-based RACH procedure, four messages may be provided between a UE and a base station. For example, during an initial attach procedure, a UE may send a preamble to the base station (e.g. message 1), receive a random access response (RAR) from the base station (e.g. message 2), send an RRC Connection Request message or other payload to the base station (e.g. message 3), and receive an RRC Connection Setup message or other transmission subject to contention resolution from the base station (e.g. message 4). This four-step RACH procedure can be simplified into a two-step RACH procedure in which the UE sends a preamble and a payload in a first message. For example, message A ("msgA") of a two-step RACH procedure may correspond to messages 1 and 3 of the four-step RACH procedure, and message B ("msgB") may correspond to messages 2 and 4 of the four-step RACH procedure. Thus, in the two-step RACH procedure, the UE may send the preamble followed by the payload in a msgA transmission to the base station, while the base station may send the RAR and the RRC response message in a msgB transmission to the UE. In NTNs, the preamble, payload, RAR, and response message may be communicated between the UE and base station via a satellite or other non-terrestrial node.

In order to configure PUSCH transmissions in two-step random access, the base station may map each preamble to a single PUSCH occasion (PO). A PO refers to the time and frequency resources where a UE may transmit PUSCH data (e.g., msgA PUSCH data). A PO is distinct from a RACH occasion (RO), which refers to the time and frequency resources where a UE may transmit a preamble (e.g., msgA preamble). Different preambles may be individually mapped to different POs. A conventional PO spans a maximum time interval of one slot. Moreover, each PO is separated from each other in the time domain by a guard time and/or in the frequency domain by a guard band.

Figure 4:
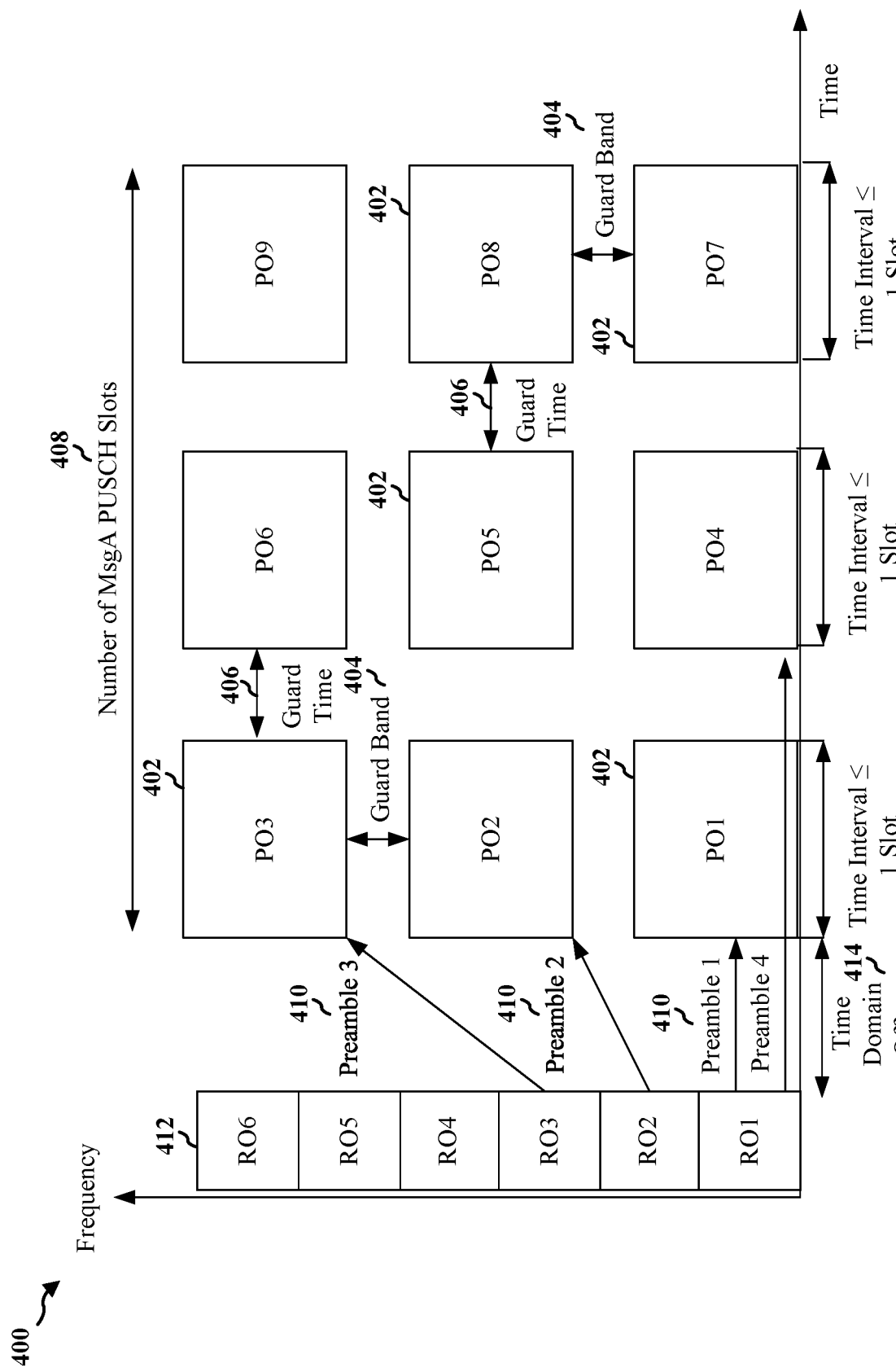
FIG. 4 is a diagram illustrating an example of POs configured for two-step random access.

FIG. 4 illustrates an example 400 of POs 402 configured for two-step RACH. The POs 402 may be arranged in order of frequency followed by time. Each PO 402 may span a time interval of at most 1 slot. Moreover, different POs may be separated from each other in frequency by a guard band 404 and separated from each other in time by a guard time 406. Additionally, the number of POs that may be configured for the different preambles or ROs may be limited within a number of msgA PUSCH slots 408 configured for two-step random access.

Initially, a UE may select and transmit a preamble 410 in an RO 412. The ROs 412 may be arranged in order of frequency followed by time, and the ROs may precede the POs by a time domain offset 414. The UE may transmit one of multiple preambles (e.g., one of 64 preambles), where one or more preambles may occupy each RO. For example, the UE may transmit msgA preamble 1 to the base station in RO1, msgA preamble 2 to the base station in RO2, or other another preamble in another or same RO. The preambles may also be of different preamble groups. For instance, preambles 1, 2, 3, and 4 may be within one configured preamble group (e.g., preamble group A), while other preambles may be within another configured preamble group (e.g., preamble group B). After transmitting the selected preamble, the UE may transmit PUSCH data in the PO 402 mapped to the transmitted preamble. For example, if the UE transmits msgA preamble 1 in RO1, the UE may transmit msgA PUSCH data in PO1 (the PO corresponding to RO1), while if the UE transmits msgA preamble 2 in RO2, the UE may transmit msgA PUSCH data in PO2 (the PO corresponding to RO2). After the base station receives msgA including the preamble and PUSCH data, the base station may transmit msgB to the UE and complete the random access.

Thus, two-step RACH procedures may significantly reduce latency in comparison to four-step RACH procedures by reducing the number of messages communicated between the UE and the base station. Such impact of reduced latency may particularly be felt in NTNs, where communication via a non-terrestrial node (e.g., a satellite) typically results in higher latencies than in other networks. However, high overhead may result from two-step RACH procedures in the event of msgA re-transmissions. For instance, if the base station fails to decode msgA PUSCH data (despite successfully decoding a msgA preamble), the base station may transmit a fallback RAR message in response to which the UE re-transmits the entire msgA again (including the preamble as well as PUSCH data). Similarly, if the UE fails to decode a success RAR message indicating that the base station successfully decoded the msgA PUSCH data, the UE may likewise retransmit the entire msgA. Thus, high overhead may result from conventional msgA re-transmissions regardless of whether RAR is successfully received or not by the base station. Furthermore, in the case of smart phone UEs, each retransmitted msgA may include PUSCH repetitions for coverage enhancement, further increasing the overhead. Additionally, two-step random access may be more limited than four-step random access (e.g., two-step RACH conventionally supports intra-slot PUSCH frequency hopping only). Accordingly, it would be helpful to improve the efficiency of two-step RACH procedures by decoupling preamble repetitions from PUSCH repetitions in msgA and allowing for more flexible repetition schemes. It would also be helpful to allow demodulation reference signal (DMRS) bundling or frequency hopping (e.g., inter-slot) for msgA PUSCH data.

Accordingly, aspects of the present disclosure provide coverage enhancement and support (including in NTNs) for repetition, frequency hopping, and antenna switching during msgA transmissions based on a preamble-to-PO mapping. A first aspect is described below with respect to FIGS. 5-10, a second aspect is described below with respect to FIG. 11, and a third aspect is described below with respect to FIG. 12. Each aspect may implemented independently from, or in combination with, any other aspect.

Referring to the first aspect, in one example, the base station (or network) may indicate to the UE a two-step RACH configuration which maps a preamble to a "jumbo" PO and an associated DMRS sequence for that PO. As used herein, a jumbo PO is a single PO which includes time-frequency resources of multiple conventional POs. For example, referring to FIG. 4, one of the preambles 410 may be mapped to a single PO encompassing the time and frequency resources referenced by PO1, PO5, and PO7. Thus, the resources in PO01, PO5, and PO7 may constitute a single, jumbo PO. Similarly, another preamble may be mapped to another PO encompassing a combination of other time and frequency resources (e.g., referenced by PO3, PO6, and PO8). Each jumbo PO may span a time interval greater than 1 slot. Alternatively, each jumbo PO may span at most 1 slot. The frequency (e.g., the starting frequency and frequency span) of each jumbo PO may change from slot to slot or from symbol to symbol.

In another example, the base station (or network) may indicate to the UE a two-step RACH configuration which maps a preamble to a set of POs and an associated set of DMRS sequences (one DMRS sequence for each PO). For example, referring to FIG. 4, one of the preambles 410 may be mapped to a set of POs including the time and frequency resources referenced by PO1, PO5, and PO7, while another one of the preambles may be mapped to another set of POs including the time and frequency resources referenced by PO3, PO6, and PO8. Each PO in a set may be defined by a pattern including at least one of a a start time location for that PO, a time interval for that PO, a starting frequency for that PO, and/or a frequency interval for that PO.

Figure 5:
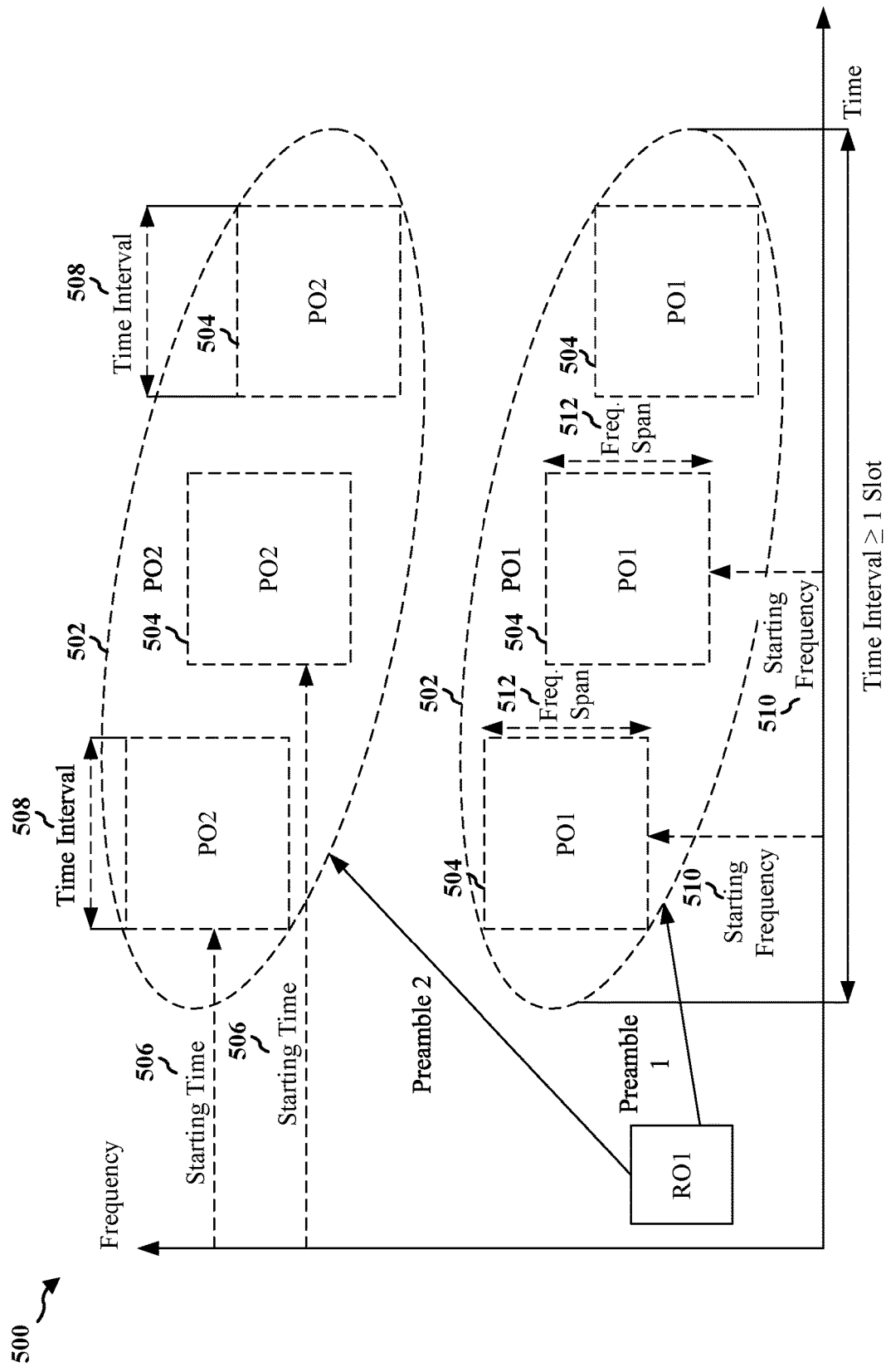
FIG. 5 is a diagram illustrating another example of POs configured for two-step random access.

FIG. 5 illustrates an example 500 of POs configured for two-step random access. The RACH configuration may indicate a preamble-to-PO mapping such that each preamble is associated with a single PO 502 (e.g., a jumbo PO including a time interval spanning more than one slot) or such that each preamble is associated with multiple POs 504 (e.g., a set of POs). For instance, the RACH configuration may associate one preamble (e.g., preamble 1) transmitted in an RO (e.g., RO1) with the single or multiple POs referenced by PO1, another preamble (e.g., preamble 2) transmitted in that RO with the single or multiple POs referenced by PO2, etc. The RACH configuration may also indicate a starting time 506 for each PO 502, 504, a time interval 508 for each PO 502, 504, a starting frequency 510 for each PO 502, 504, and a frequency span 512 for each PO 502, 504. In one example, the starting frequency 510 of different POs 502, 504 may change from slot to slot or symbol to symbol (e.g., such as illustrated in FIG. 5). In another example, the frequency span 512 of different POs 502, 504 may change from slot to slot or symbol to symbol.

Moreover, the two-step RACH configuration may include a DMRS configuration associated with the jumbo PO or set of POs. In one example, the DMRS configuration may indicate a DMRS pattern associated with the jumbo PO. For instance, the DMRS configuration may indicate the time and frequency location of the DMRS resources associated with a jumbo PO. Such DMRS pattern may be orthogonal to (e.g., does not overlap in time or in frequency with) another DMRS pattern configured for that jumbo PO. Alternatively, the DMRS pattern may not be orthogonal to (e.g., overlaps in time, in frequency, or in both with) the other DMRS pattern. Such non-orthogonality may increase the number of available DMRS patterns for that jumbo PO (and thus the number of UEs supported for that jumbo PO) in comparison to orthogonal DMRS patterns. In another example, the DMRS configuration may indicate a DMRS sequence associated with the jumbo PO. For instance, the DMRS configuration may indicate the value modulated onto the DMRS resources associated with a jumbo PO. Such DMRS sequence modulated onto a DMRS pattern may be orthogonal to the DMRS sequence modulated onto the same DMRS pattern associated with another jumbo PO (e.g., the dot product of the two DMRS sequences is equal to zero). Alternatively, the DMRS sequence may not be orthogonal to the DMRS sequence associated with such other jumbo PO (e.g., the dot product of the two DMRS sequences is not equal to zero). Thus, where multiple preambles are mapped to the same jumbo PO (and thus are associated with the same DMRS pattern), orthogonal or non-orthogonal DMRS sequences for each preamble may serve to differentiate the DMRS for channel estimation.

In another example, the DMRS configuration may indicate a DMRS pattern associated with a set of POs. For instance, the DMRS configuration may indicate the time and frequency location for the DMRS resources associated with the preamble corresponding to that set of POs. Such DMRS pattern may be orthogonal to (e.g., does not overlap in time or in frequency with) another DMRS pattern associated with another preamble, PO, or set of POs. Alternatively, the DMRS pattern may not be orthogonal to (e.g., overlaps in time, in frequency or in both with) the other DMRS pattern. Such non-orthogonality may increase the number of available DMRS patterns for that set of PO (and thus the number of UEs supported for that set of POs) in comparison to orthogonal DMRS patterns. In another example, the DMRS configuration may indicate a DMRS sequence associated with the set of POs. For instance, the DMRS configuration may indicate the value modulated onto the DMRS resources associated with the preamble corresponding to a set of POs. Such DMRS sequence may be orthogonal to the DMRS sequence modulated onto the same DMRS resources associated with another preamble, PO, or set of POs. Alternatively, the DMRS sequence may not be orthogonal to the DMRS sequence associated with such other DMRS pattern.

Figure 6:
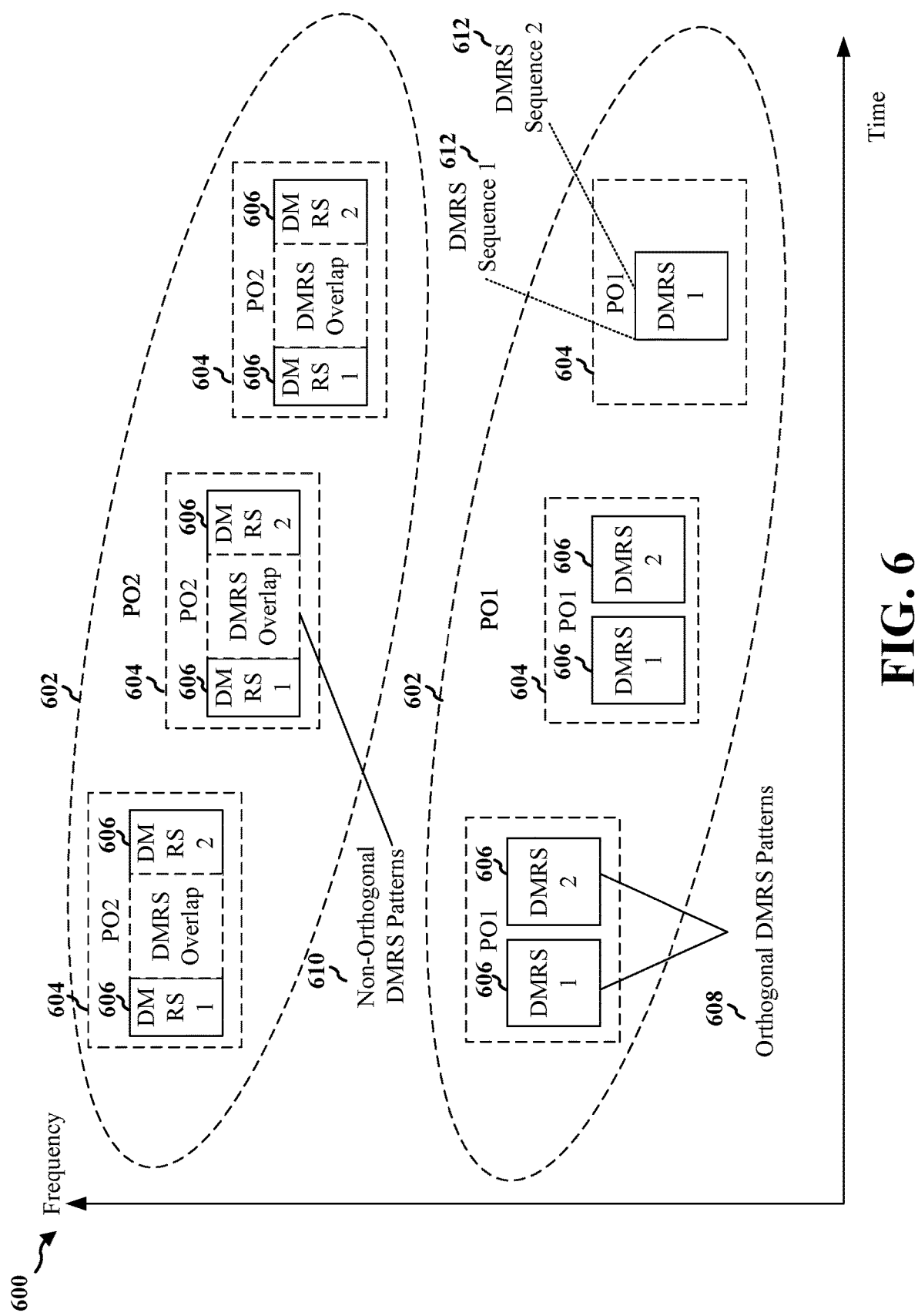
FIG. 6 is a diagram illustrating another example of POs configured for two-step random access.

FIG. 6 illustrates an example 600 of POs 602, 604 configured for two-step random access. PO 602 may correspond to single PO 502 of FIG. 5, and PO 604 may correspond to multiple POs 504 of FIG. 5. The DMRS configuration may indicate a DMRS pattern 606 associated with PO 602 or POs 604. For instance, the DMRS configuration may indicate one of multiple DMRS patterns (e.g., DMRS 1 or DMRS 2) associated with the single or multiple POs referenced by PO1, PO2, or another PO or set of POs. For instance DMRS 1 may be one DMRS pattern associated with one UE, while DMRS 2 may be another DMRS pattern associated with another UE. The DMRS patterns may be orthogonal DMRS patterns 608 such as illustrated in the example of PO1 (e.g., the resources for DMRS 1 and DMRS 2 do not overlap in time), or the DMRS patterns may be non-orthogonal DMRS patterns 610 such as illustrated in the example of PO2 (e.g., the resources for DMRS 1 and DMRS 2 overlap at least partially in time). The DMRS configuration may alternatively or additionally indicate a DMRS sequence 612 associated with the PO 602 or POs 604. For instance, the DMRS configuration may indicate one of multiple DMRS sequences (e.g., DMRS sequence 1 or DMRS sequence 2) modulated onto the DMRS resources for the single or multiple POs referenced by PO1, PO2, or another PO or set of POs. The DMRS sequences may be orthogonal DMRS sequences or non-orthogonal DMRS sequences with respect to each other. For instance, DMRS sequence 1 and 2 may be orthogonal or non-orthogonal DMRS sequences which are modulated onto the same DMRS pattern (e.g., DMRS 1 in the illustrated example).

Figure 7:
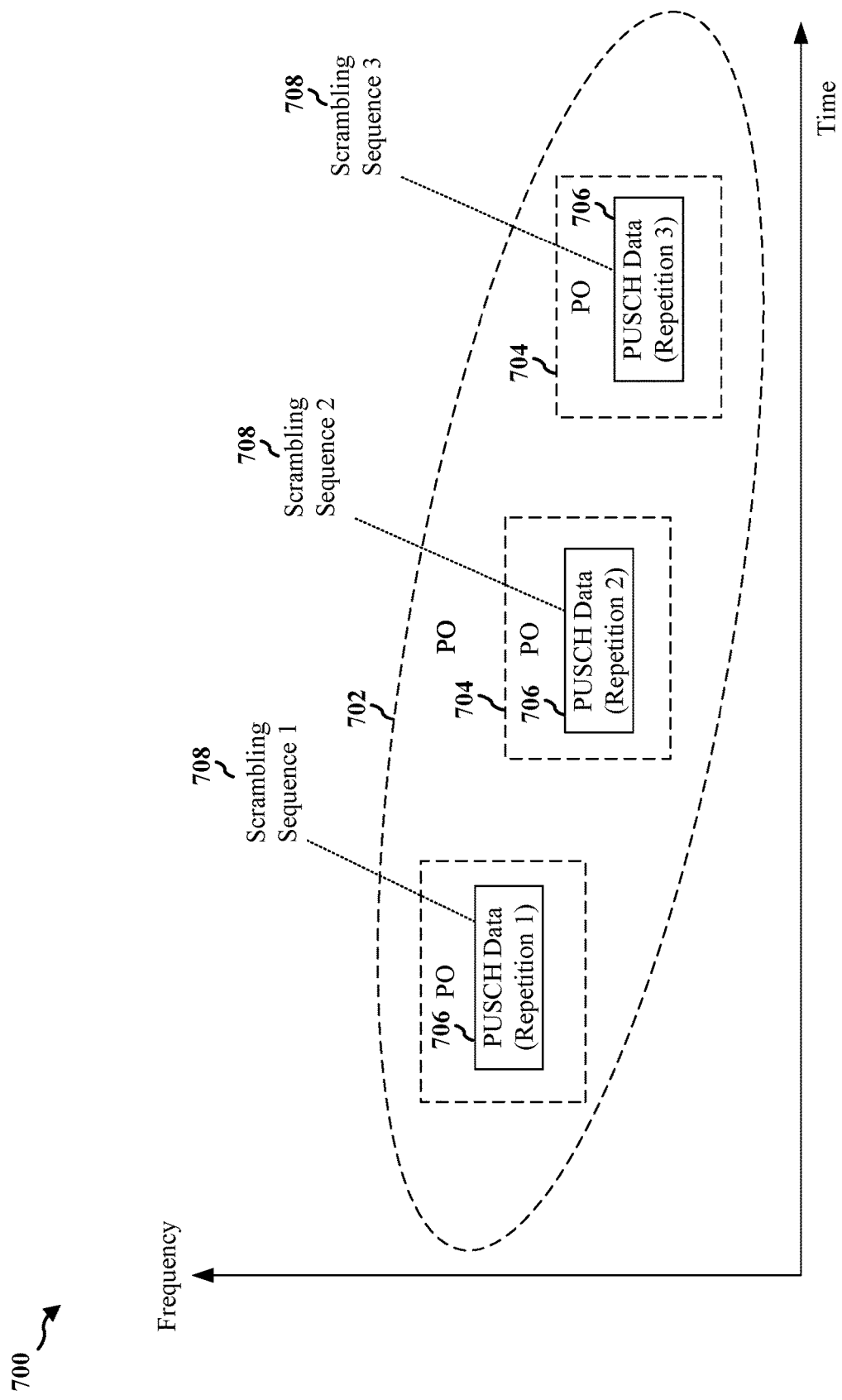
FIG. 7 is a diagram illustrating another example of POs configured for two-step random access.

In a further example, when the UE sends repetitions of PUSCH data in a jumbo PO or set of POs (e.g., msgA PUSCH repetitions), the UE may apply different scrambling sequences to the msgA PUSCH repetitions. The UE may scramble the repetitions based on the scrambling sequence prior to modulation and transmission. As a result, interference may be reduced between msgA PUSCH transmissions from different UEs (which transmit data over neighboring beams). For instance, FIG. 7 illustrates an example 700 of POs 702, 704 configured for two-step random access in which msgA PUSCH repetitions 706 are scrambled according to different scrambling sequences 708 and subsequently modulated and transmitted to a base station. PO 702 may correspond to single PO 502, 602 of FIGS. 5 and 6, and PO 704 may correspond to multiple POs 504, 604 of FIGS. 5 and 6. For example, the UE may scramble one PUSCH repetition 706 in the POs 702, 704 based on a first one of the scrambling sequences 708 (e.g., scrambling sequence 1), the UE may scramble another PUSCH repetition in the POs 702, 704 based on a second one of the scrambling sequences (e.g., scrambling sequence 2), and the UE may scramble a further PUSCH repetition in the POs 702, 704 based on a third one of the scrambling sequences (e.g., scrambling sequence 3). One or more of the scrambling sequences 708 may be different from the other scrambling sequences. By applying different scrambling sequences, interference (e.g., between neighboring msgA transmissions) may be minimized.

In another example, the preamble associated with the jumbo PO or set of POs may be transmitted in multiple ROs.

Figure 8:
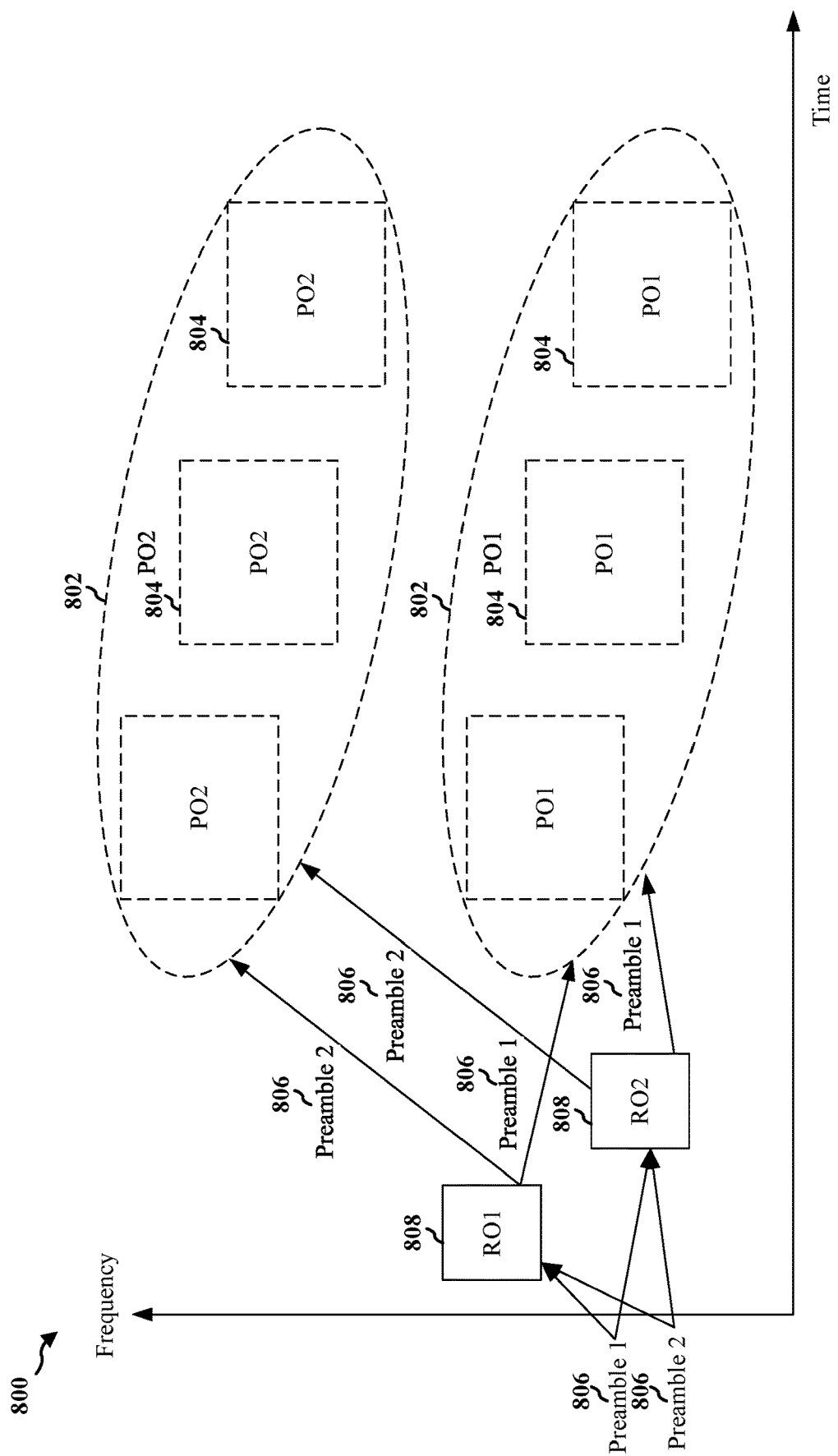
FIG. 8 is a diagram illustrating another example of POs configured for two-step random access.

For instance, FIG. 8 illustrates an example 800 of POs 802, 804 configured for two-step random access in which preambles 806 are transmitted in multiple ROs 808. PO 802 may correspond to single PO 502, 602, 702 of FIGS. 5-7, and PO 804 may correspond to multiple POs 504, 604, 704 of FIGS. 5-7. For example, the UE may transmit one of the preambles 806 (e.g., preamble 1) in multiple ROs 808 (e.g., RO1 and RO2). The UE may similarly transmit other preambles (e.g., preamble 2) in multiple ROs. Thus, in contrast to the example of FIG. 5 where each preamble occupies only one RO (and thus each PO corresponds to a single RO), here a preamble may occupy multiple ROs (and thus each PO or set of POs may correspond to multiple ROs). For instance, PO1 may correspond to RO1 and RO2, and PO2 may similarly correspond to RO1 and RO2. Such one-to-many mapping of preambles to ROs (and thus ROs to POs) may provide support for improved frequency hopping, antenna switching, and additional repetitions beyond that available in one-to-one mappings of preambles to ROs.

Figure 9:
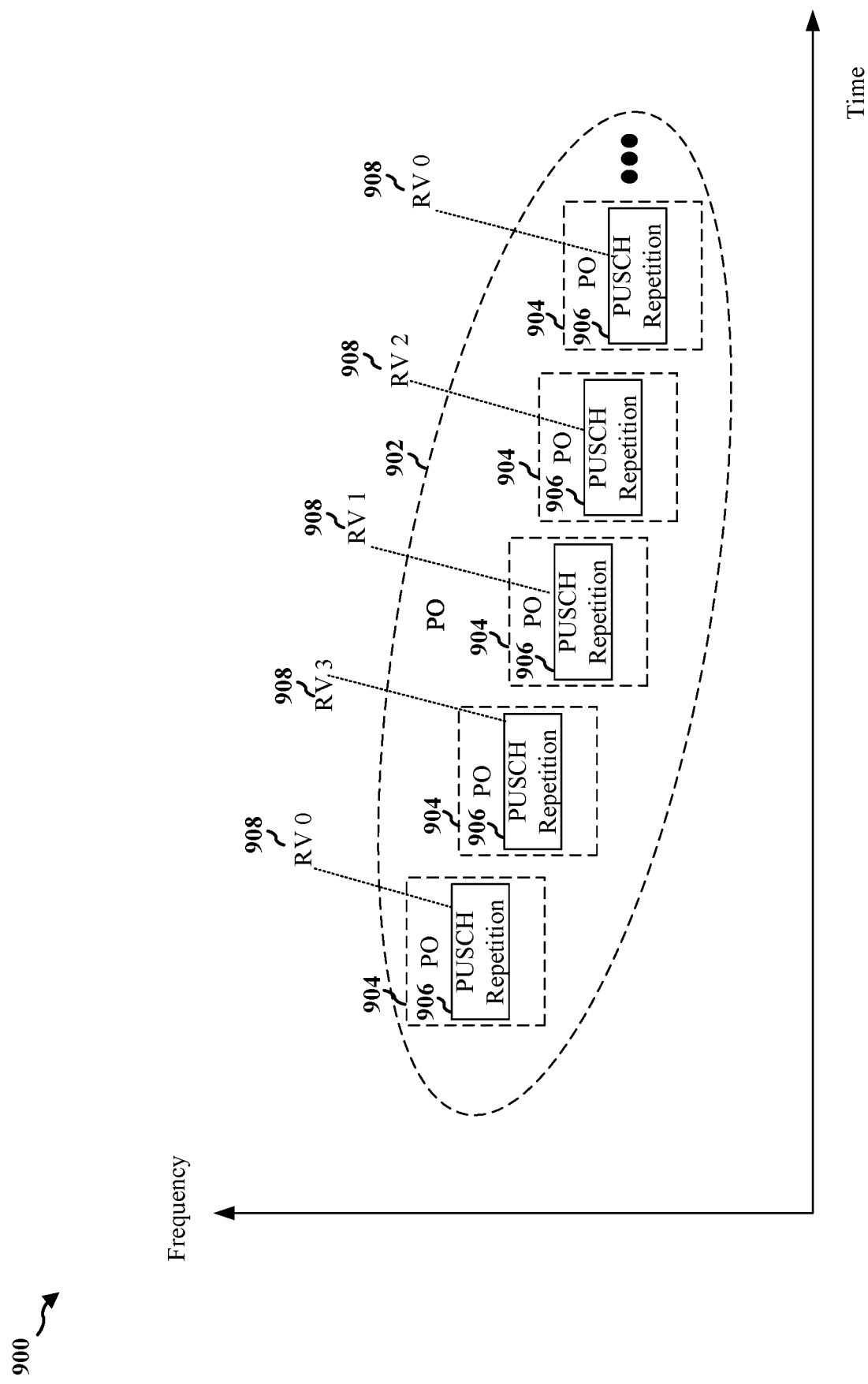
FIG. 9 is a diagram illustrating another example of POs configured for two-step random access.

In a further example, the UE may transmit msgA PUSCH repetitions on the PO or set of POs associated with the preamble selected by the UE. In such case, redundancy version (RV) cycling may be applied across the PUSCH repetitions. For instance, FIG. 9 illustrates an example 900 of POs 902, 904 configured for two-step random access in which msgA PUSCH repetitions 906 are transmitted with different redundancy versions 908 according to a preconfigured cycle. PO 902 may correspond to single PO 502, 602, 702, 802 of FIGS. 5-8, and PO 904 may correspond to multiple POs 504, 604, 704, 804 of FIGS. 5-8. In the illustrated example, the redundancy versions 908 are designated according to the pattern "0312" (e.g. 0 for the first repetition, 3 for the second repetition, 1 for the third repetition, and 2 for the fourth repetition), and the redundancy versions cycle after four PUSCH repetitions (e.g., the RV returns to 0 for the fifth repetition, 3 for the sixth repetition, etc.). In other examples, different redundancy version cycling patterns may be configured. In some aspects, the redundancy versions are disjoint in the circular buffer and constitute the entire set of bits in the circular buffer. In some aspects, the redundancy versions overlap in the circular buffer.

Figure 10:
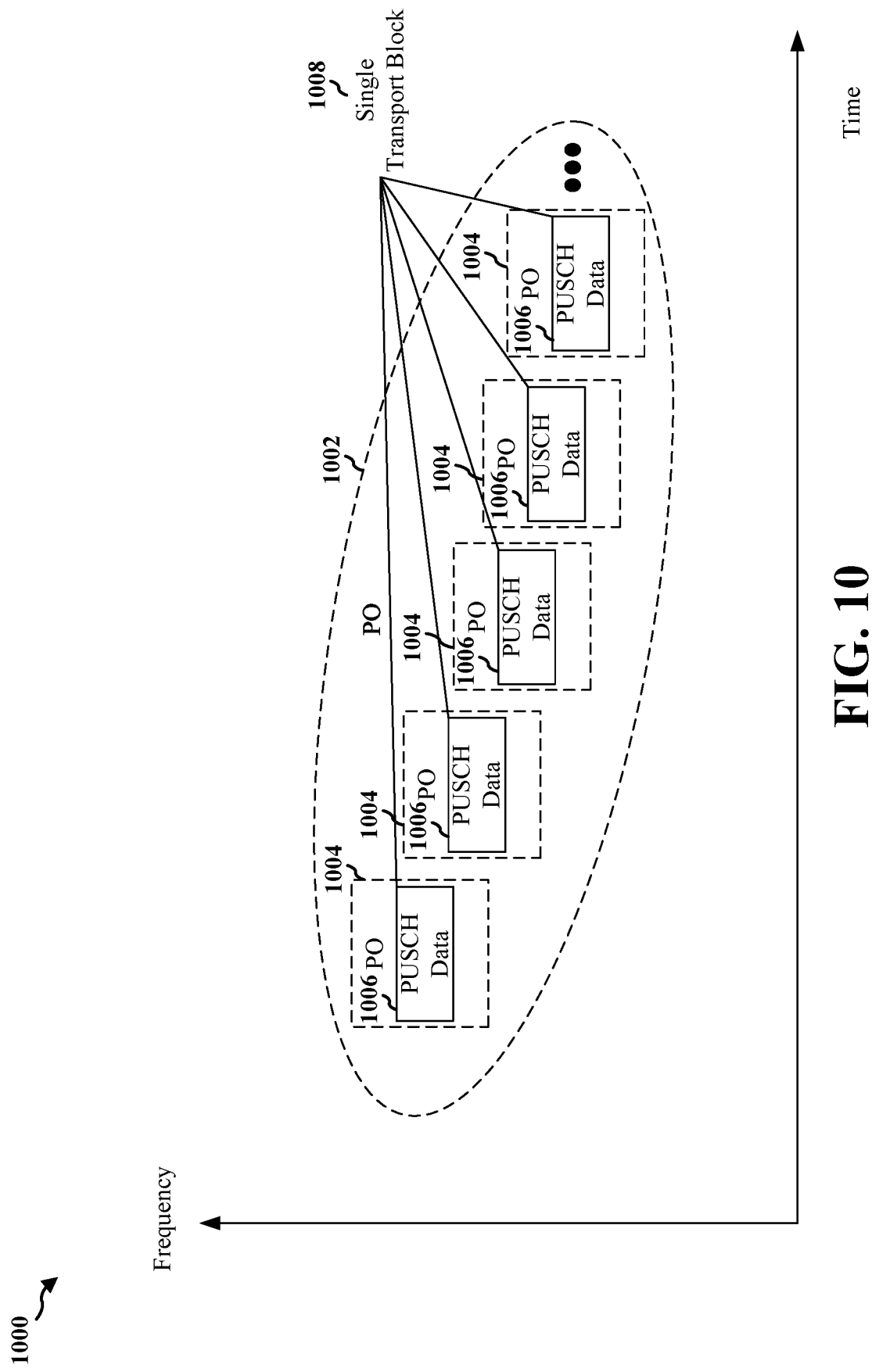
FIG. 10 is a diagram illustrating another example of POs configured for two-step random access.

In another example, the UE may transmit a single transport block across the PO or set of POs associated with the preamble selected by the UE. For instance, FIG. 10 illustrates an example 1000 of POs 1002, 1004 configured for two-step random access in which msgA PUSCH data 1006 is transmitted over a single transport block 1008 across the POs 1002, 1004. PO 1002 may correspond to single PO 502, 602, 702, 802, 902 of FIGS. 5-9, and PO 1004 may correspond to multiple POs 504, 604, 704, 804, 904 of FIGS. 5-9. In other examples, the UE may transmit a single redundancy version of a transport block across the PO or set of POs associated with the preamble selected by the UE.

In a further example, the UE may apply diversity techniques during a msgA PUSCH transmission, such as frequency hopping (intra-slot or inter-slot frequency hopping), antenna switching (which may occur at the end of a PUSCH repetition), or DMRS bundling (which may be applied across frequency-shared POs prior to a frequency hop). For example, referring to FIGS. 9 and 10, each PUSCH repetition 906 or PUSCH data 1006 may be carried within resources (of single PO 902, 1002) or POs (of multiple POs 904, 1004) at different frequencies, and the UE may hop between the frequencies (e.g., from one resource or PO to another resource or PO) within a same slot (intra-slot) or between multiple slots (inter-slot). Moreover, the UE may switch its antennas (e.g., antennas 352 in FIG. 3) between PUSCH repetitions 906. For instance, the UE may transmit one PUSCH repetition from one antenna, another PUSCH repetition from another antenna, etc.

Referring to the second aspect, the base station may provide multiple msgA PO configurations to UEs of different GNSS capabilities. For example, the base station (or network) may signal to a UE (e.g., in a system information block (SIB) or a radio resource control (RRC) message) a plurality of msgA PO configurations, and the UE may select one of the PO configurations for msgA PUSCH transmissions. The PO configurations may indicate the time-frequency resources of one or more POs, which may be configured according to any of the above described examples. For instance, the POs defined in the PO configurations may correspond to any of POs 402, 502, 504, 602, 604, 702, 704, 802, 804, 902, 904, 1002, or 1004.

The msgA PO configurations may differ in guard time and guard band. For instance, one PO configuration may include a shorter guard time and a narrower guard band between POs, while another PO configuration may include a longer guard time and a wider guard band between POs. The msgA PO configurations may also be specific to different preamble groups. For instance, one PO configuration may apply to group A preambles (e.g., the UE may transmit PUSCH data in the POs), while another PO configuration may apply to the same group A preambles. Similarly, different msgA PO configurations may apply to group B preambles (e.g., two PO configurations may apply to the same group P preambles).

The UE may select one of the PO configurations based on UE capability. In one example, the UE capability may include (or be based on) GNSS capability. For instance, the UE capability may be based on GNSS accuracy with respect to the UE's location (which depends on how frequent the UE may perform a GNSS correction or GNSS fix), or accuracy with respect to the satellite ephemeris (which depends on how frequent the UE may read the ephemeris). The UE may receive ephemeris in an SIB. The UE capability may alternatively or additionally be based on whether the UE has GNSS capability. Alternatively or additionally, the UE capability may include (or be based on) the device type of the UE. For instance, the UE capability may be based on whether the UE is a VSAT or a handheld device.

Additionally, the guard time and guard band of the PO configurations may be configured or selected based on UE capability. For instance, a PO configuration including a shorter guard time and narrower guard band between POs may apply to UEs with high capability, while a PO configuration including a longer guard time and wider guard band between POs may apply to UEs with low capability. Here, a UE may be considered to have high capability, for example, if the UE has GNSS capability, if the UE has high GNSS accuracy (e.g., the UE frequently performs GNSS corrections), if the UE has high accuracy with respect to the satellite ephemeris (e.g., the UE frequently reads the ephemeris in an SIB), or if the UE is a VSAT. Alternatively, a UE may be considered to have low capability, for example, if the UE does not have GNSS capability, or if the UE has GNSS capability but with low GNSS accuracy (e.g., the UE infrequently performs GNSS corrections) or with low accuracy with respect to the satellite ephemeris (e.g., the UE infrequently reads the ephemeris in an SIB), or if the UE is a handheld device.

Figure 11:
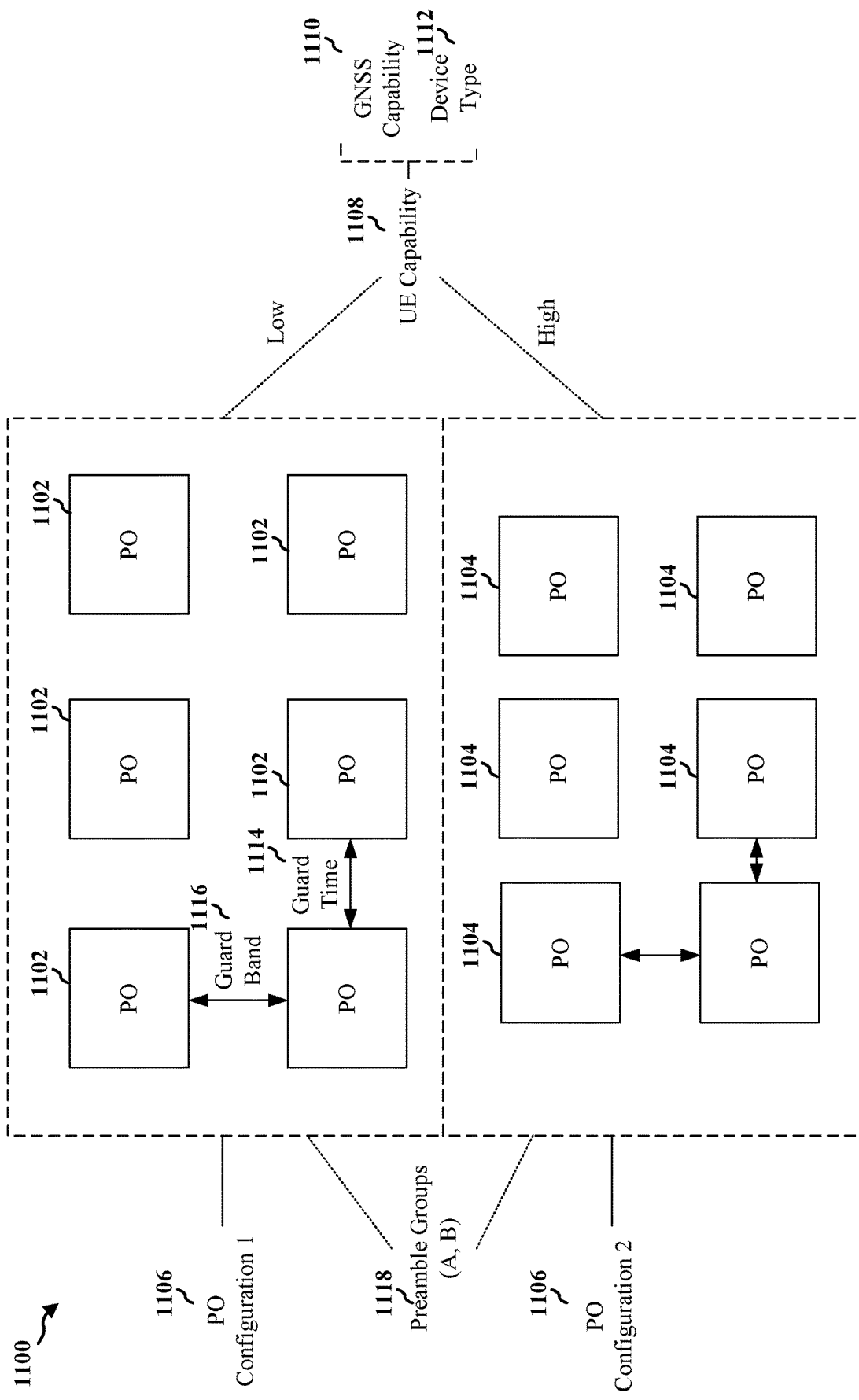
FIG. 11 is a diagram illustrating another example of POs configured for two-step random access.

FIG. 11 illustrates an example 1100 of POs 1102, 1104 configured for two-step random access in multiple PO configurations 1106. POs 1102, 1104 may correspond to any of POs 402, 502, 504, 602, 604, 702, 704, 802, 804, 902, 904, 1002, or 1004 in FIGS. 4-10. The UE may choose one of the PO configurations for two-step random access based on a UE capability 1108. For example, the UE capability may be based on GNSS capability 1110 or device type 1112. The PO configurations 1106 may differ in guard time 1114 or guard band 1116. For instance, PO configuration 1 may include longer guard times and wider guard bands between POs than PO configuration 2. The difference in guard time or guard band may depend on UE capability. For instance, the UE may select PO configuration 1 (with its longer guard time and wider guard band between POs 1102) if the UE has low capability, while the UE may select PO configuration 2 (with its shorter guard time and narrower guard band between POs 1104) if the UE has high capability. Additionally, the PO configurations may be specific to preamble groups 1118. For instance, PO configuration 1 may correspond to preamble group A, while PO configuration 2 may correspond to preamble group B.

Referring to the third aspect, the base station may configure a sub-PRB guard band for POs. Generally, a PO guard band (e.g., guard band 404 in FIG. 4) may be configured to span either 1 PRB or 0 PRBs (no guard band). For instance, referring to FIG. 4, each PO 402 may be separated in frequency by 1 PRB. However, for low coverage UEs, POs are typically configured with a frequency span of 1 PRB in order to provide a reasonable signal to interference and noise ratio (SINR) for such UEs. As a result, an inefficient amount of frequency resources may be allocated to the guard band (e.g., at most 50% assuming a 1 PRB guard band and a 1 PRB PO). Accordingly, to provide more efficient frequency resource allocation for guard bands, the base station may configure the guard band for POs at the finer subcarrier level, rather than at the coarser PRB level. For instance, the granularity of the guard band configuration may be configured in units of n subcarriers, where n is an integer less than the number of subcarriers in a PRB (e.g., n=12). For example, the base station may configure a PO to have a guard band less than 12 subcarriers (assuming 12 subcarriers per PRB). As a result, a smaller percentage of frequency resources may be allocated to the guard band, allowing for more POs to occupy the same time over different frequencies.

Figure 12:
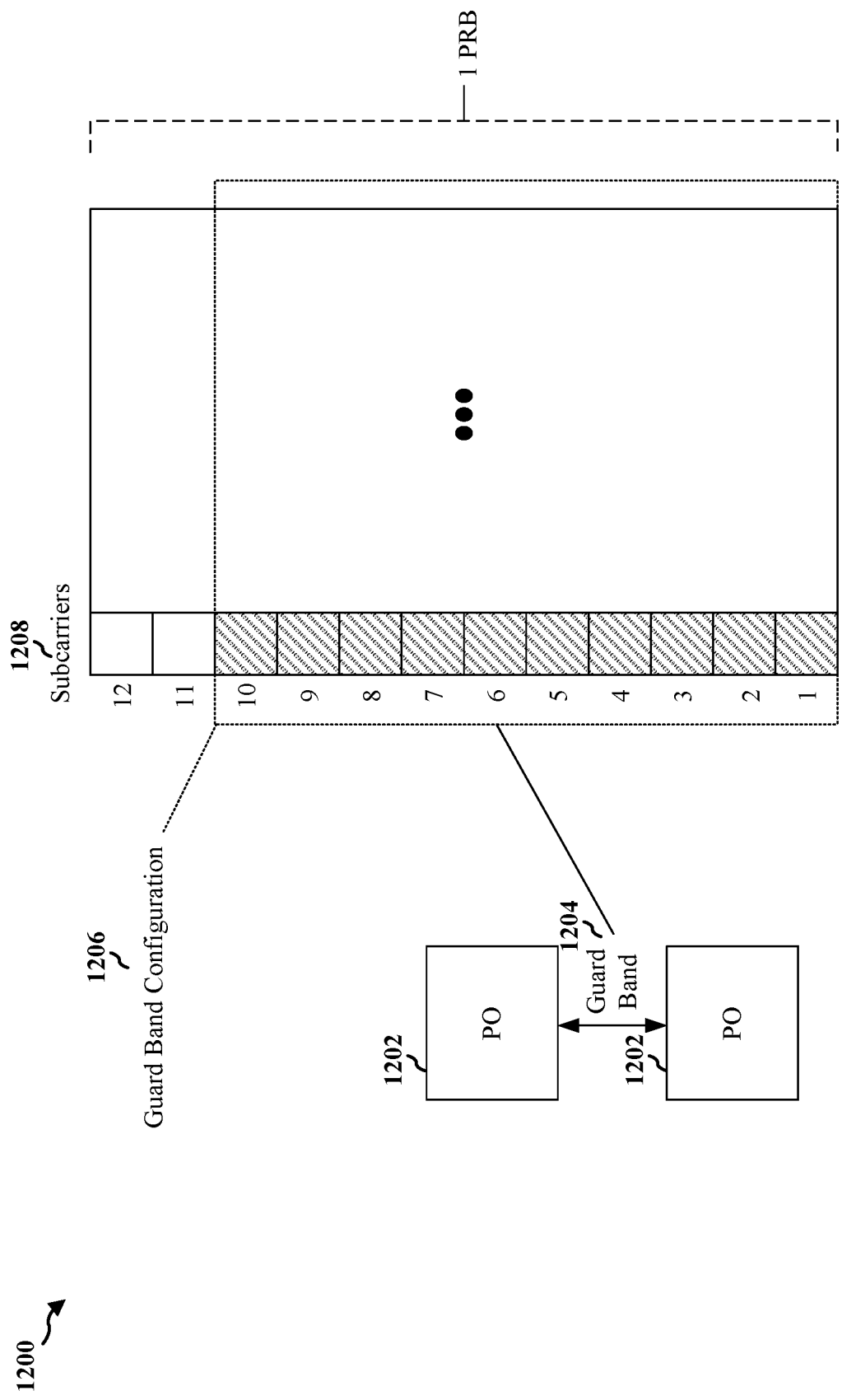
FIG. 12 is a diagram illustrating another example of POs configured for two-step random access.

FIG. 12 illustrates an example 1200 of POs 1202 configured for two-step random access, where a guard band 1204 between POs 1202 is configured with a frequency span of less than 1 PRB (less than 12 subcarriers). POs 1202 may correspond to any of POs 402, 502, 504, 602, 604, 702, 704, 802, 804, 902, 904, 1002, 1004, 1102, 1104 in FIGS. 4-11. The base station (or network) may provide a guard band configuration 1206 to the UE which indicates a number of subcarriers 1208 for the guard band 1204, where the number of subcarriers 1208 here is less than 12. For instance, in the illustrated example, the base station may configure the guard band 1204 to span only ten subcarriers. As a result, the percentage of frequency resources allocated to the guard band may be decreased.

Figure 13:
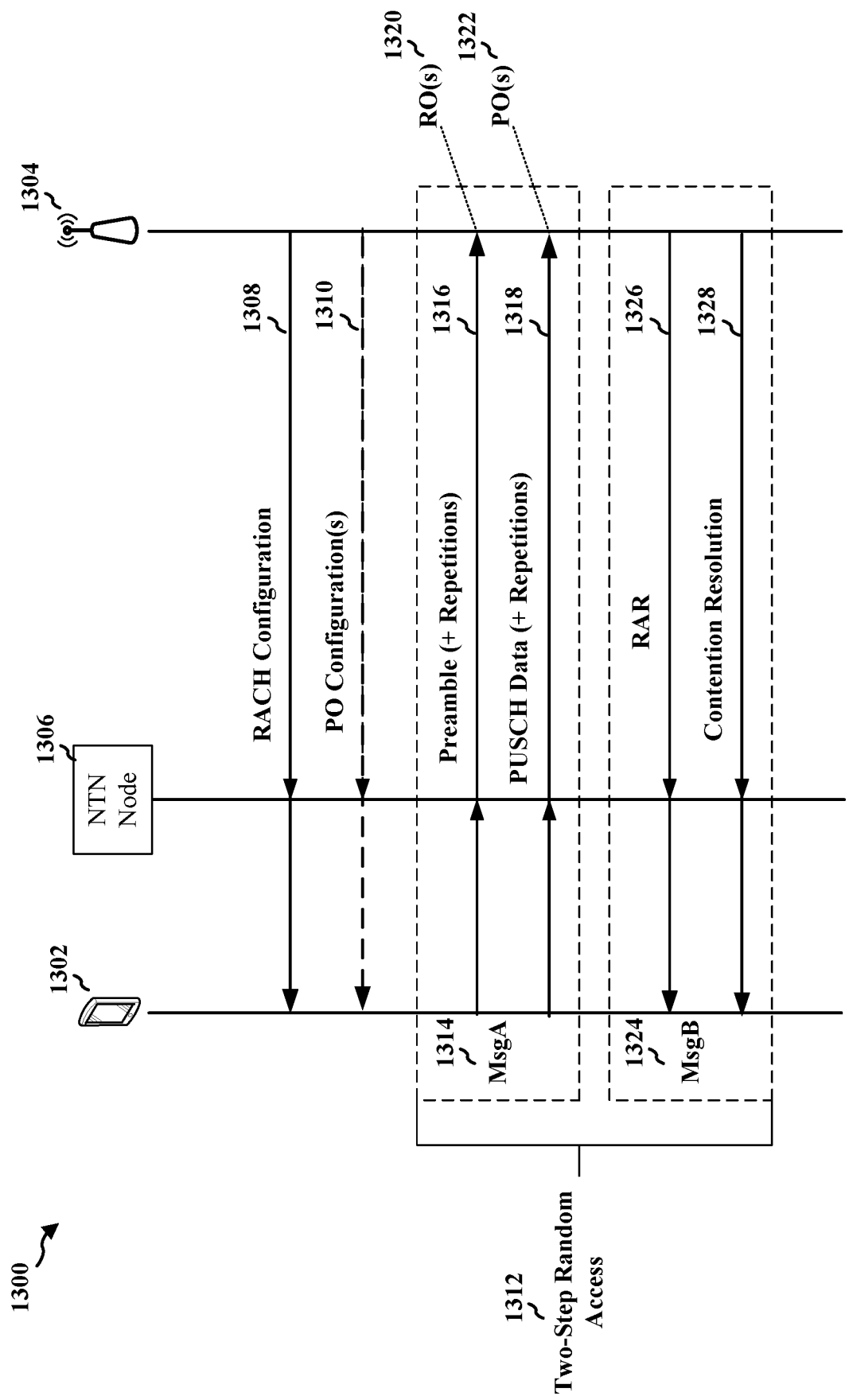
FIG. 13 is a call flow diagram between a UE and a base station.

FIG. 13 is an example 1300 of a call flow between a UE 1302 and a base station 1304. The UE and base station may be part of a NTN and communicate with each other via a NTN node 1306 (e.g., a satellite). Alternatively, the UE and base station may communicate with each other directly. The base station may initially provide a RACH configuration 1308 to the UE. The RACH configuration 1308 may include various parameters for two-step random access, such as a physical random access channel (PRACH) configuration, a preamble power ramping step size, frequency resources for PRACH, a RAR window, and other information. The base station may also provide one or more PO configurations 1310 to the UE. The PO configuration(s) 1310 may include various parameters specifying the PUSCH allocation for msgA in two-step random access, such as time-frequency domain resources, DMRS type, modulation and coding scheme (MCS), PUSCH transmission power-related parameters, and other information.

In one example, the RACH configuration 1308, the one or more PO configuration(s) 1310, or a combination of the RACH and PO configuration(s) may map a preamble to a jumbo PO and an associated DMRS sequence for that PO, or may map a preamble to a set of POs and an associated set of DMRS sequences, such as described above with respect to FIG. 5. In another example, the RACH configuration 1308, the one or more PO configuration(s) 1310, or a combination of the RACH and PO configuration(s) may include a DMRS configuration associated with the jumbo PO or set of POs, such as described above with respect to FIG. 6. In a further example, the RACH configuration 1308, the one or more PO configuration(s) 1310, or a combination of the RACH and PO configuration(s) may be based on UE capability, such as described above with respect to FIG. 11. In another example, the RACH configuration 1308, the one or more PO configuration(s) 1310, or a combination of the RACH and PO configuration(s) may include a sub-PRB guard band configuration, such as described above with respect to FIG. 12.

After the UE 1302 obtains the configuration(s), the UE 1302 and base station 1304 may perform a two-step random access procedure 1312. For example, the UE may transmit a msgA 1314 including a preamble 1316 and PUSCH data 1318. The UE may also transmit repetitions of the preamble 1316 and repetitions of the PUSCH data 1318. The preamble 1316 and its repetitions may be transmitted in one or more ROs 1320, and the PUSCH data 1318 and its repetitions may be transmitted in one or more POs 1322. In one example, the UE 1302 may apply different scrambling sequences to the repetitions of the PUSCH data 1318, such as described above with respect to FIG. 7. In another example, the preamble 1316 may be transmitted in multiple ones of the ROs 1320, such as described above with respect to FIG. 8. In a further example, RV cycling may be applied across the repetitions of the PUSCH data 1318, such as described above with respect to FIG. 9. In an additional example, the PUSCH data 1318 may be transmitted in a single transport block across the POs 1322, such as described above with respect to FIG. 10. The UE 1302 may also frequency hop between POs 1322 (intra-slot or inter-slot), switch antennas from one PUSCH data repetition to another, or bundle DMRS across frequency-shared POs. In a further example, the UE may select a PO configuration from the PO configurations 1310 based on a UE capability and transmit the PUSCH data 1318 and repetitions in the POs 1322 defined by the selected PO configuration. Following successful receipt of the preamble 1316 and PUSCH data 1318, the base station may transmit a msgB 1324 including a RAR 1326 and a contention resolution message 1328. As a result, random access may be achieved.

Figure 14:
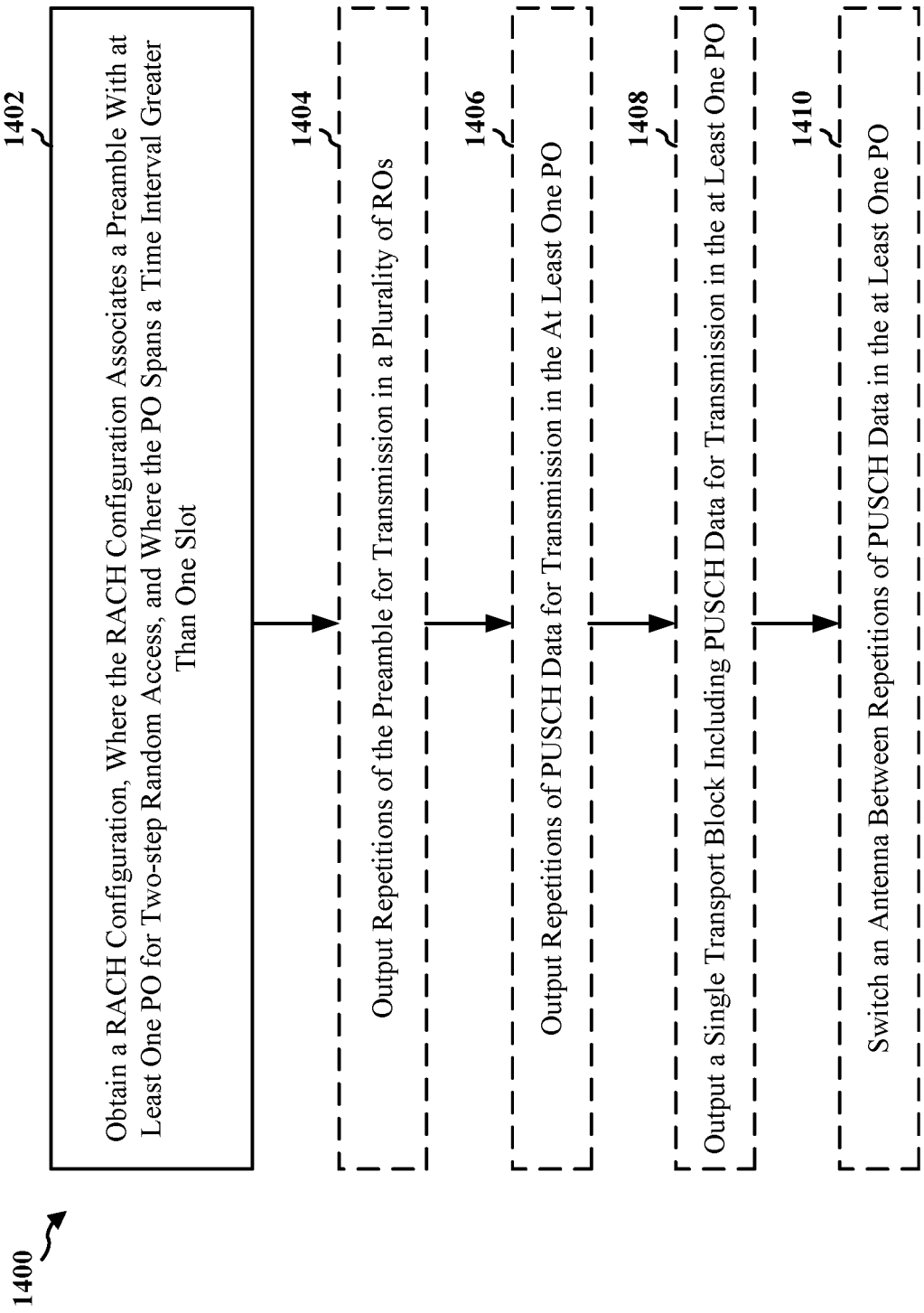
FIG. 14 is a flowchart of a method of wireless communication.

FIG. 14 is a flowchart 1400 of a method of wireless communication. The method may be performed by a UE (e.g., the UE 104, 350, 1302; the apparatus 2202). Optional aspects are illustrated in dashed lines.

At 1402, the UE obtains a RACH configuration, where the RACH configuration associates a preamble with at least one PO for two-step random access, and where the PO spans a time interval greater than one slot. For example, 1402 may be performed by RACH configuration component 2240.

In one example, a starting frequency or a frequency span of the at least one PO may change across slots or symbols. In one example, the at least one PO may include orthogonal DMRS patterns. In one example, the at least one PO may include non-orthogonal DMRS patterns. In one example, the at least one PO may include DMRS patterns associated with orthogonal DMRS sequences. In one example, the at least one PO may include DMRS patterns associated with non-orthogonal DMRS sequences. In one example, the at least one PO may include repetitions of PUSCH data associated with different scrambling sequences.

At 1404, the UE may transmit, or output for transmission, repetitions of the preamble in a plurality of ROs. For example, 1404 may be performed by preamble repetition component 2242.

At 1406, the UE may transmit, or output for transmission, repetitions of PUSCH data in the at least one PO. For example, 1406 may be performed by PUSCH data repetition component 2244. In one example, the repetitions may be associated with cycled redundancy versions.

At 1408, the UE may transmit, or output for transmission, a single transport block including PUSCH data in the at least one PO. For example, 1408 may be performed by PUSCH transport block component 2246.

In one example, the at least one PO may include intra-slot frequency hopping or inter-slot frequency hopping.

At 1410, the UE may switch an antenna between repetitions of PUSCH data in the at least one PO. For example, 1410 may be performed by antenna switch component 2248.

In one example, a plurality of DMRS may be bundled in the at least one PO.

Figure 15:
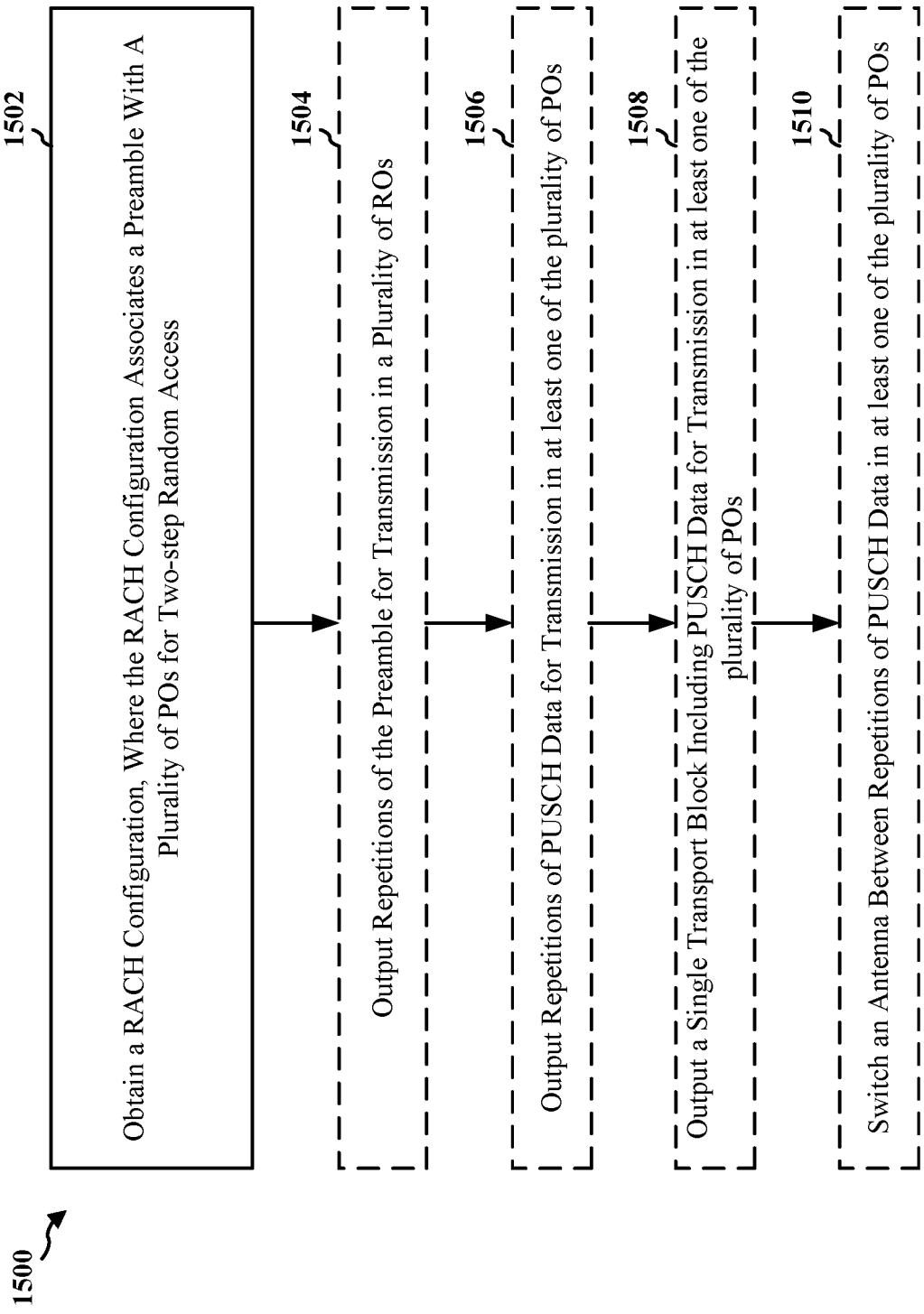
FIG. 15 is a flowchart of a method of wireless communication.

FIG. 15 is a flowchart 1500 of a method of wireless communication. The method may be performed by a UE (e.g., the UE 104, 350, 1302; the apparatus 2202). Optional aspects are illustrated in dashed lines.

At 1502, the UE obtains a RACH configuration, where the RACH configuration associates a preamble with a plurality of POs for two-step random access. For example, 1502 may be performed by RACH configuration component 2240.

In one example, each of the POs may include a start time location, a time interval, a start frequency location, and a frequency interval. In one example, the one or more of the POs may include orthogonal DMRS patterns. In one example, the one or more of the POs may include non-orthogonal DMRS patterns. In one example, the one or more of the POs may include DMRS patterns associated with orthogonal DMRS sequences. In one example, the one or more of the POs may include DMRS patterns associated with non-orthogonal DMRS sequences. In one example, the one or more of the POs may include repetitions of PUSCH data associated with different scrambling sequences.

At 1504, the UE may transmit, or output for transmission, repetitions of the preamble in a plurality of ROs. For example, 1504 may be performed by preamble repetition component 2242.

At 1506, the UE may transmit, or output for transmission, repetitions of PUSCH data in at least one of the plurality of POs. For example, 1506 may be performed by PUSCH data repetition component 2244. In one example, the repetitions may be associated with cycled redundancy versions.

At 1508, the UE may transmit, or output for transmission, a single transport block including PUSCH data in the POs. For example, 1508 may be performed by PUSCH transport block component 2246.

In one example, the one or more of the POs may include intra-slot frequency hopping or inter-slot frequency hopping.

At 1510, the UE may switch an antenna between repetitions of PUSCH data in at least one of the plurality of POs. For example, 1510 may be performed by antenna switch component 2248.

In one example, a plurality of DMRS may be bundled in the POs.

Figure 16:
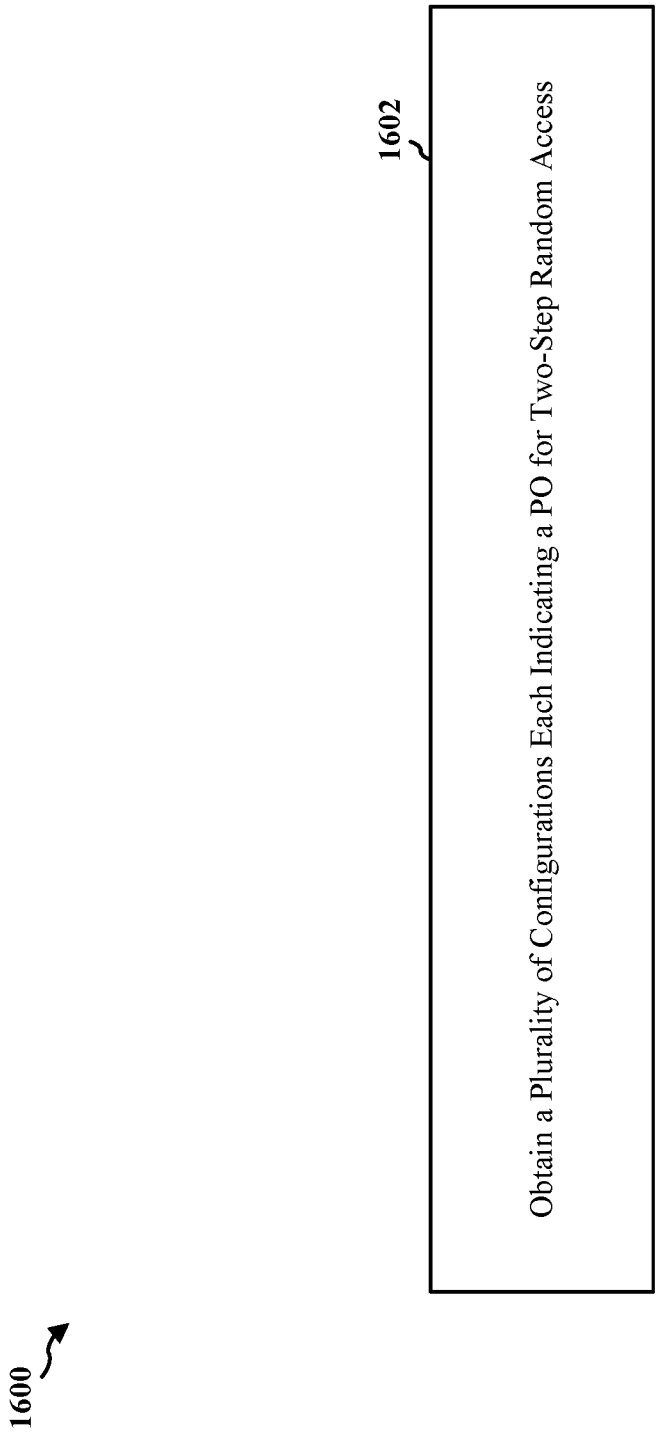
FIG. 16 is a flowchart of a method of wireless communication.

FIG. 16 is a flowchart 1600 of a method of wireless communication. The method may be performed by a UE (e.g., the UE 104, 350, 1302; the apparatus 2202). Optional aspects are illustrated in dashed lines.

At 1602, the UE obtains a plurality of configurations each indicating a PO for two-step random access. For example, 1602 may be performed by PO configuration component 2250.

In one example, the configurations may each be associated with a UE capability. In one example, the UE capability may include a GNSS capability or a UE type. In one example, the configurations may differ in guard time and guard band. In one example, the configurations may be specific to different preamble groups.

Figure 17:
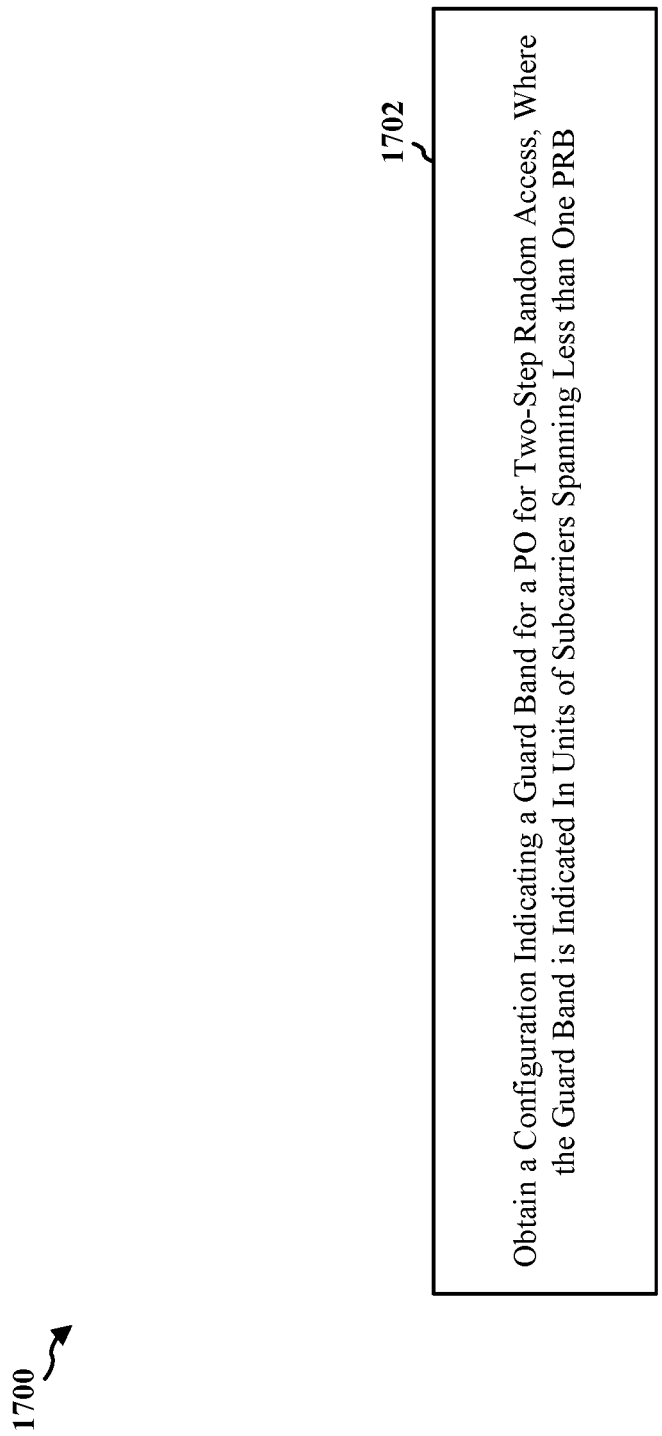
FIG. 17 is a flowchart of a method of wireless communication.

FIG. 17 is a flowchart 1700 of a method of wireless communication. The method may be performed by a UE (e.g., the UE 104, 350, 1302; the apparatus 2202). Optional aspects are illustrated in dashed lines.

At 1702, the UE obtains a configuration indicating a guard band for a PO for two-step random access, where the guard band is indicated in units of subcarrier spanning less than one PRB. For example, 1702 may be performed by guard band configuration component 2252.

Figure 18:
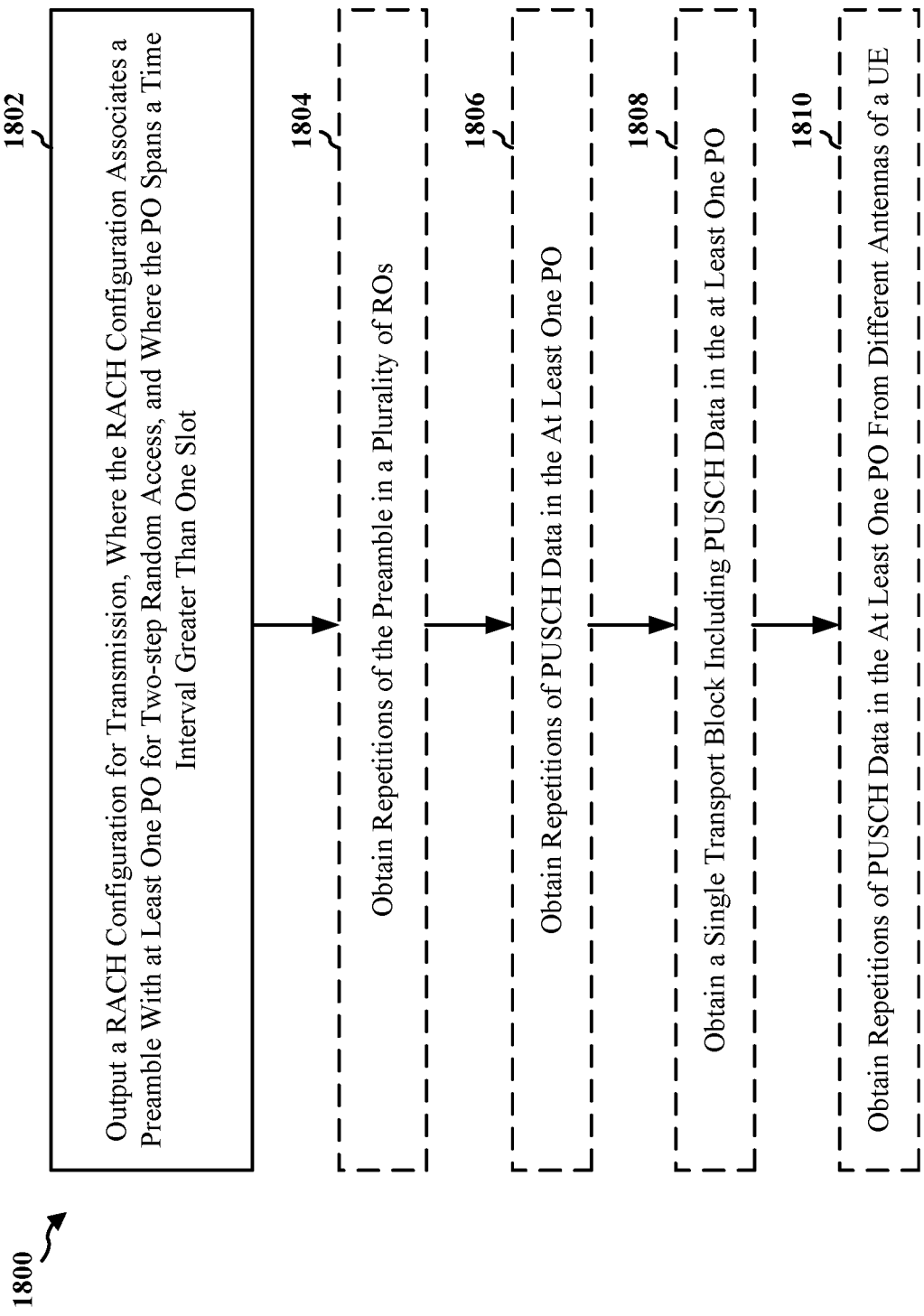
FIG. 18 is a flowchart of a method of wireless communication.

FIG. 18 is a flowchart 1800 of a method of wireless communication. The method may be performed by a base station (e.g., the base station 102/180, 310, 1304; the apparatus 2302). Optional aspects are illustrated in dashed lines.

At 1802, the base station provides, or outputs for transmission, a RACH configuration, where the RACH configuration associates a preamble with at least one PO for two-step random access, and where the PO spans a time interval greater than one slot. For example, 1802 may be performed by RACH configuration component 2340.

In one example, a starting frequency or a frequency span of the at least one PO may change across slots or symbols. In one example, the at least one PO may include orthogonal DMRS patterns. In one example, the at least one PO may include non-orthogonal DMRS patterns. In one example, the at least one PO may include DMRS patterns associated with orthogonal DMRS sequences. In one example, the at least one PO may include DMRS patterns associated with non-orthogonal DMRS sequences. In one example, the at least one PO may include repetitions of PUSCH data associated with different scrambling sequences.

At 1804, the base station may receive or obtain repetitions of the preamble in a plurality of ROs. For example, 1804 may be performed by preamble repetition component 2342.

At 1806, the base station may receive or obtain repetitions of PUSCH data in the at least one PO. For example, 1806 may be performed by PUSCH data repetition component 2344. In one example, the repetitions may be associated with cycled redundancy versions.

At 1808, the base station may receive or obtain a single transport block including PUSCH data in the at least one PO. For example, 1808 may be performed by PUSCH transport block component 2346.

In one example, the at least one PO may include intra-slot frequency hopping or inter-slot frequency hopping.

At 1810, the base station may receive or obtain repetitions of PUSCH data in the at least one PO from different antennas of a UE. For example, 1810 may be performed by PUSCH data antenna component 2348.

In one example, a plurality of DMRS may be bundled in the at least one PO.

Figure 19:
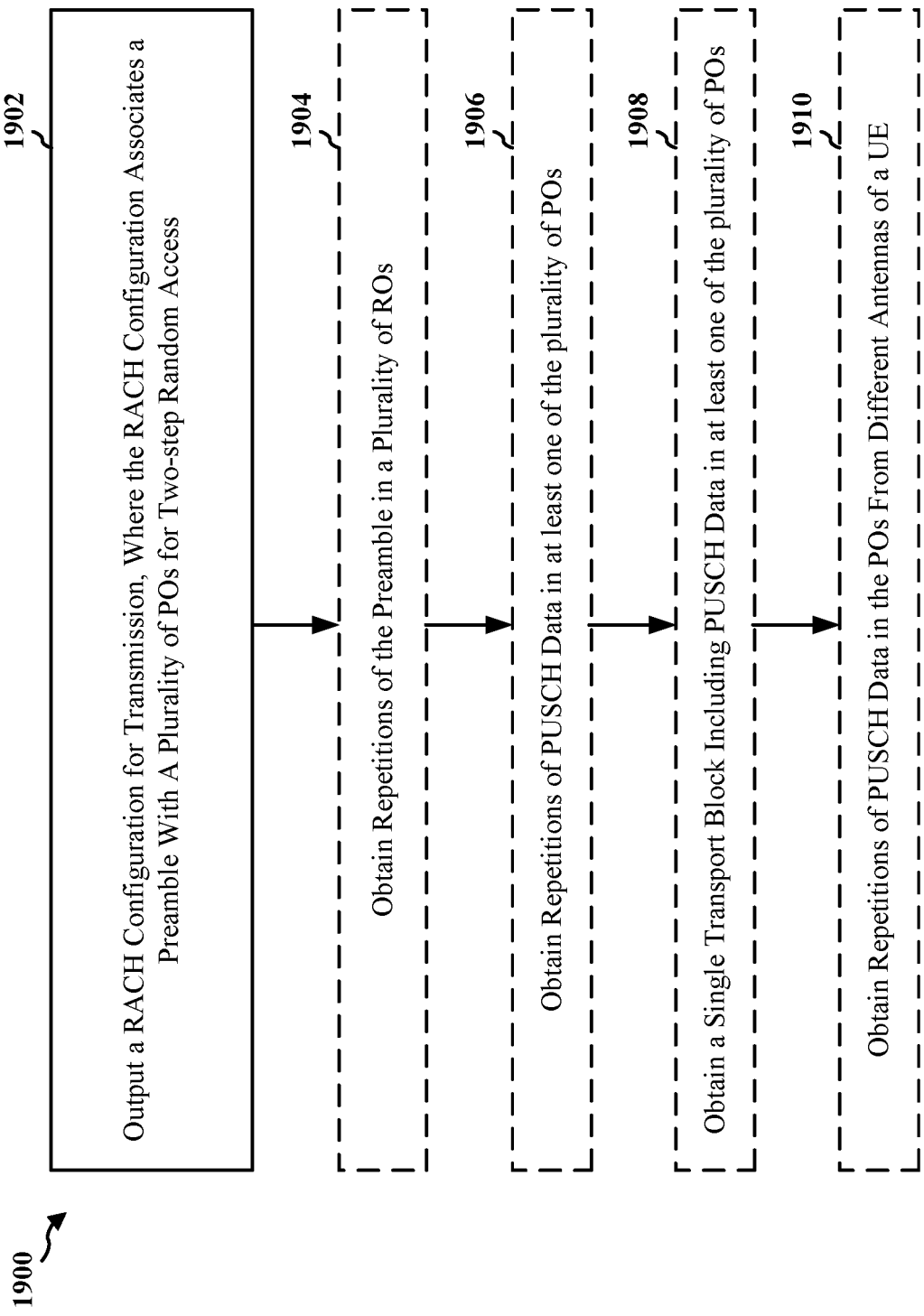
FIG. 19 is a flowchart of a method of wireless communication.

FIG. 19 is a flowchart 1900 of a method of wireless communication. The method may be performed by a base station (e.g., the base station 102/180, 310, 1304; the apparatus 2302). Optional aspects are illustrated in dashed lines.

At 1902, the base station provides, or outputs for transmission, a RACH configuration, where the RACH configuration associates a preamble with a plurality of POs for two-step random access. For example, 1902 may be performed by RACH configuration component 2340.

In one example, each of the POs may include a start time location, a time interval, a start frequency location, and a frequency interval. In one example, the one or more of the POs may include orthogonal DMRS patterns. In one example, the one or more of the POs may include non-orthogonal DMRS patterns. In one example, the one or more of the POs may include DMRS patterns associated with orthogonal DMRS sequences. In one example, the one or more of the POs may include DMRS patterns associated with non-orthogonal DMRS sequences. In one example, the one or more of the POs may include repetitions of PUSCH data associated with different scrambling sequences.

At 1904, the base station may receive or obtain repetitions of the preamble in a plurality of ROs. For example, 1904 may be performed by preamble repetition component 2342.

At 1906, the base station may receive or obtain repetitions of PUSCH data in at least one of the plurality of POs. For example, 1906 may be performed by PUSCH data repetition component 2344. In one example, the repetitions may be associated with cycled redundancy versions.

At 1908, the base station may receive or obtian a single transport block including PUSCH data in the POs. For example, 1908 may be performed by PUSCH transport block component 2346.

In one example, the one or more of the POs may include intra-slot frequency hopping or inter-slot frequency hopping.

At 1910, the base station may receive or obtain repetitions of PUSCH data in the POs from different antennas of a UE. For example, 1910 may be performed by PUSCH data antenna component 2348.

In one example, a plurality of DMRS may be bundled in the POs.

Figure 20:
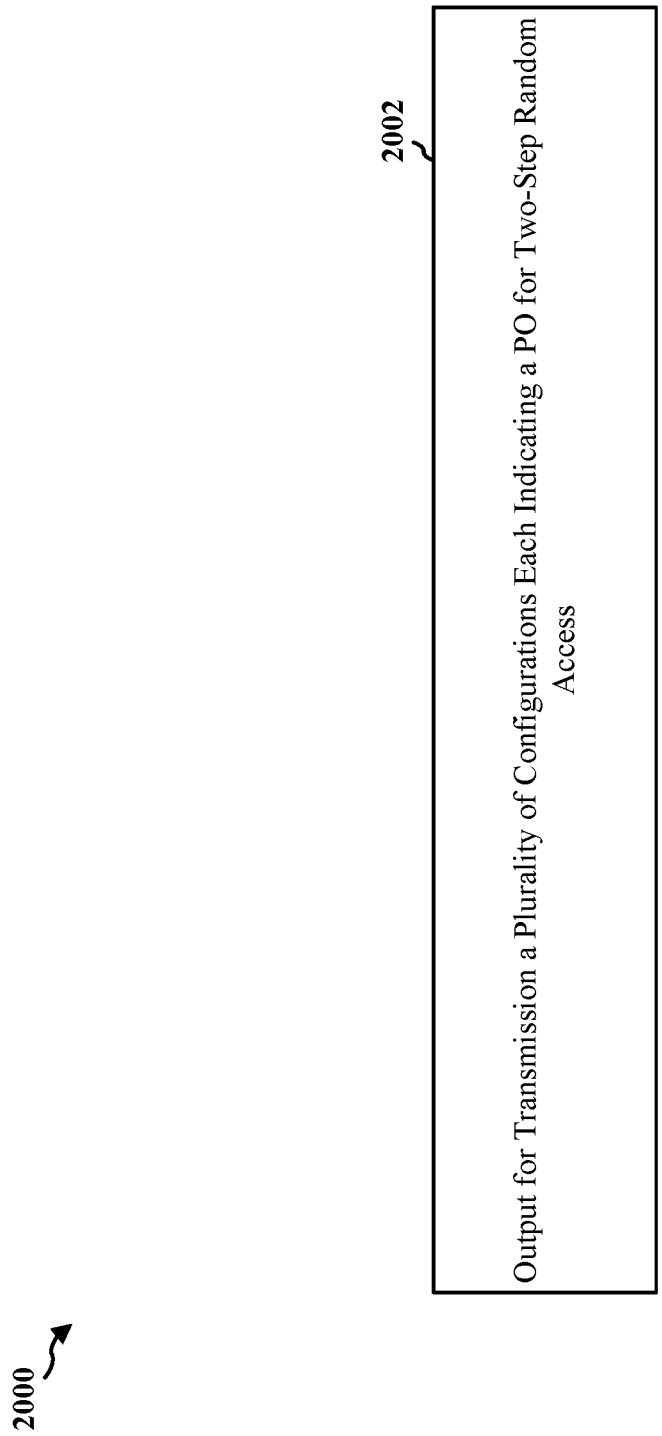
FIG. 20 is a flowchart of a method of wireless communication.

FIG. 20 is a flowchart 2000 of a method of wireless communication. The method may be performed by a base station (e.g., the base station 102/180, 310, 1304; the apparatus 2302). Optional aspects are illustrated in dashed lines.

At 2002, the base station provides, or outputs for transmission, a plurality of configurations each indicating a PO for two-step random access. For example, 2002 may be performed by PO configuration component 2350.

In one example, the configurations may each be associated with a UE capability. In one example, the UE capability may include a GNSS capability or a UE type. In one example, the configurations may differ in guard time and guard band. In one example, the configurations may be specific to different preamble groups.

Figure 21:
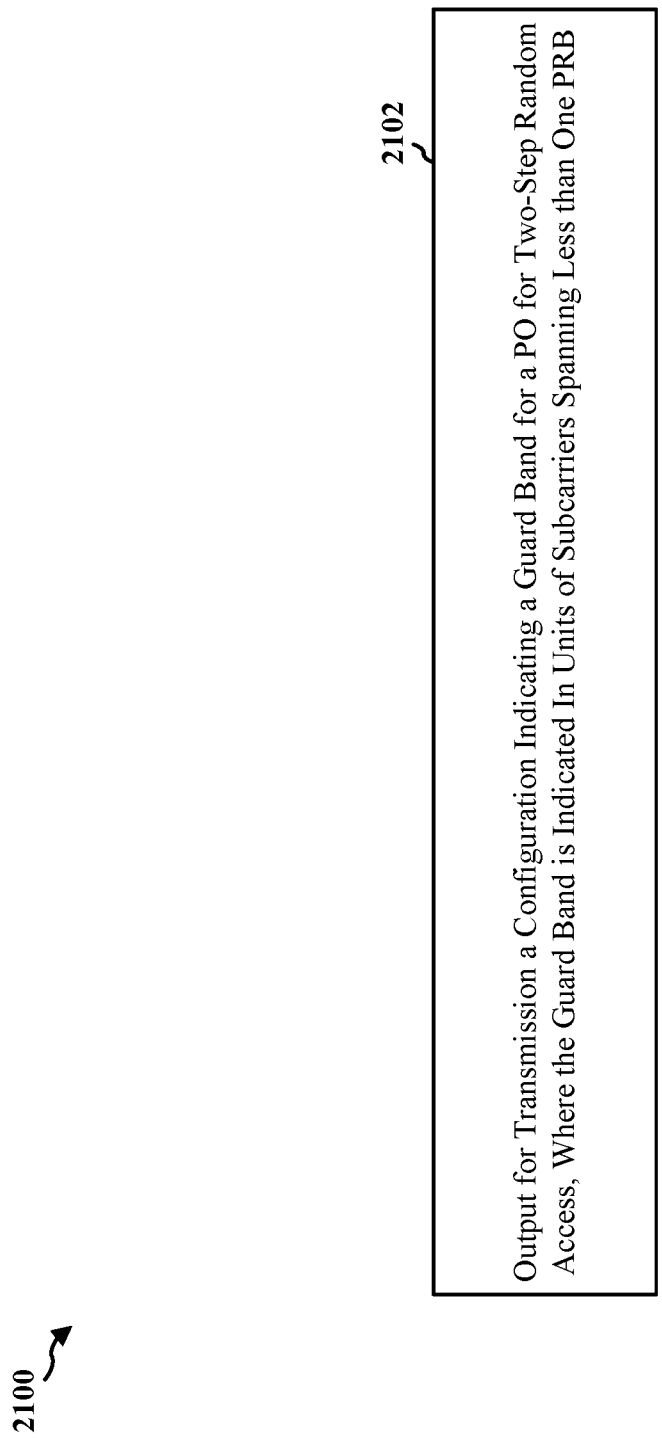
FIG. 21 is a flowchart of a method of wireless communication.

FIG. 21 is a flowchart 2100 of a method of wireless communication. The method may be performed by a base station (e.g., the base station 102/180, 310, 1304; the apparatus 2302). Optional aspects are illustrated in dashed lines.

At 2102, the base station provides, or outputs for transmission, a configuration indicating a guard band for a PO for two-step random access, where the guard band is indicated in units of subcarrier spanning less than one PRB. For example, 2102 may be performed by guard band configuration component 2352.

Figure 22:
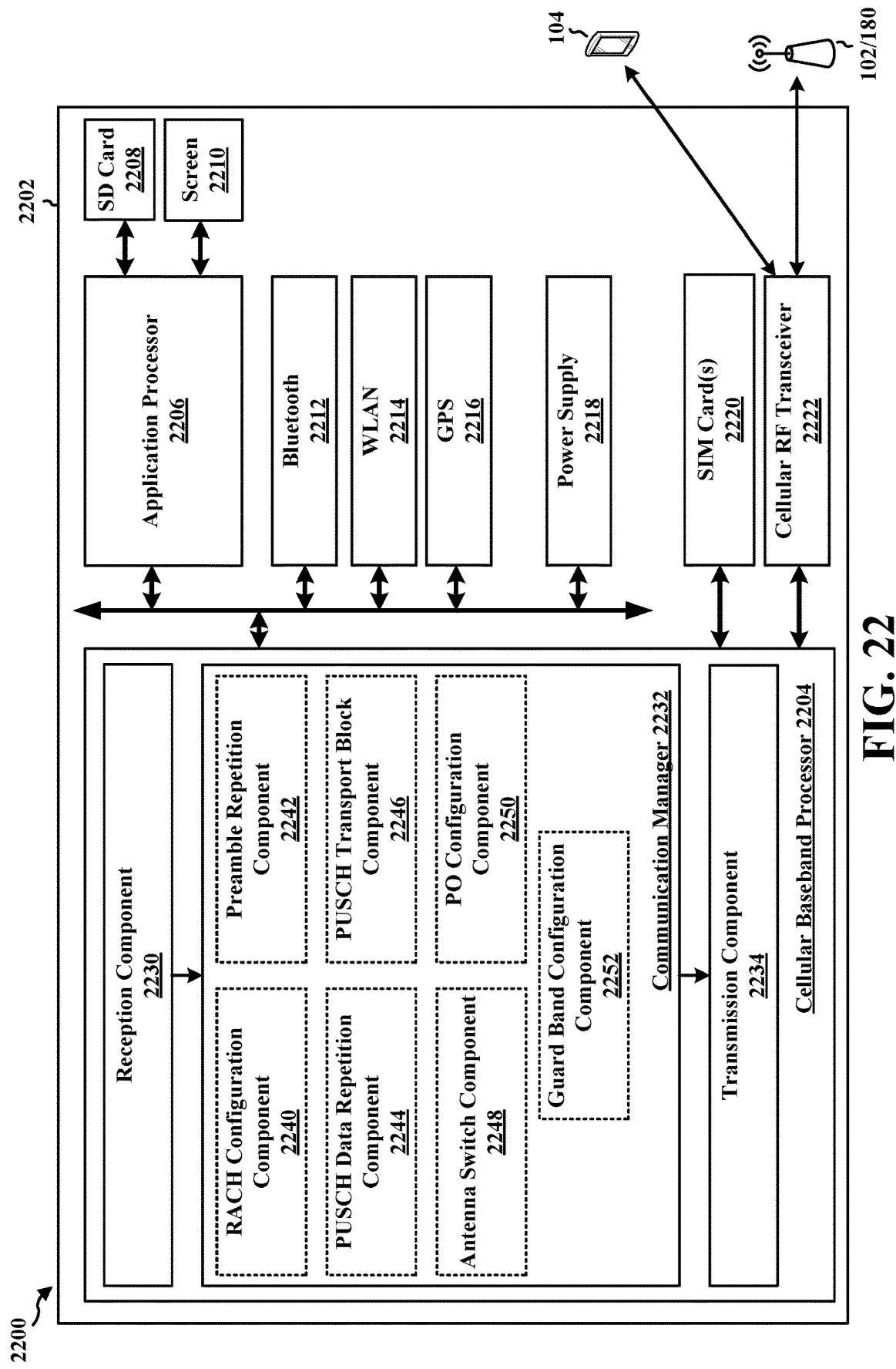
FIG. 22 is a diagram illustrating an example of a hardware implementation for an example apparatus.

FIG. 22 is a diagram 2200 illustrating an example of a hardware implementation for an apparatus 2202. The apparatus 2202 is a UE and includes a cellular baseband processor 2204 (also referred to as a modem) coupled to a cellular RF transceiver 2222 and one or more subscriber identity modules (SIM) cards 2220, an application processor 2206 coupled to a secure digital (SD) card 2208 and a screen 2210, a Bluetooth module 2212, a wireless local area network (WLAN) module 2214, a Global Positioning System (GPS) module 2216, and a power supply 2218. The cellular baseband processor 2204 communicates through the cellular RF transceiver 2222 with the UE 104 and/or BS 102/180. The cellular baseband processor 2204 may include a computer-readable medium/memory. The computer-readable medium/memory may be non-transitory. The cellular baseband processor 2204 is responsible for general processing, including the execution of software stored on the computer-readable medium/memory. The software, when executed by the cellular baseband processor 2204, causes the cellular baseband processor 2204 to perform the various functions described supra. The computer-readable medium/memory may also be used for storing data that is manipulated by the cellular baseband processor 2204 when executing software. The cellular baseband processor 2204 further includes a reception component 2230, a communication manager 2232, and a transmission component 2234. The communication manager 2232 includes the one or more illustrated components. The components within the communication manager 2232 may be stored in the computer-readable medium/memory and/or configured as hardware within the cellular baseband processor 2204. The cellular baseband processor 2204 may be a component of the UE 350 and may include the memory 360 and/or at least one of the TX processor 368, the RX processor 356, and the controller/processor 359. In one configuration, the apparatus 2202 may be a modem chip and include just the baseband processor 2204, and in another configuration, the apparatus 2202 may be the entire UE (e.g., see 350 of FIG. 3) and include the aforementioned additional modules of the apparatus 2202.

The communication manager 2232 includes a RACH configuration component 2240 that is configured to obtain a random access channel (RACH) configuration, wherein the RACH configuration associates a preamble with at least one physical uplink shared channel (PUSCH) occasion (PO) for two-step random access, and wherein the PO spans a time interval greater than one slot, e.g., as described in connection with 1402. The RACH configuration component 2240 may alternatively or additionally be configured to obtain a random access channel (RACH) configuration, wherein the RACH configuration associates a preamble with a plurality of physical uplink shared channel (PUSCH) occasions (POs) for two-step random access, e.g., as described in connection with 1502. The communication manager 2232 includes a preamble repetition component 2242 that is configured to transmit, or output for transmission, repetitions of the preamble in a plurality of ROs, e.g., as described in connection with 1404 and 1504. The communication manager 2232 includes a PUSCH data repetition component 2244 that is configured to transmit, or output for transmission, repetitions of PUSCH data in the at least one PO, e.g., as described in connection with 1406 and 1506. The communication manager 2232 includes a PUSCH transport block component 2246 that is configured to transmit, or output for transmission, a single transport block including PUSCH data in the at least one PO, e.g., as described in connection with 1408 and 1508. The communication manager 2232 includes an antenna switch component 2248 that is configured to switch an antenna between repetitions of PUSCH data in the at least one PO, e.g., as described in connection with 1410 and 1510. The communication manager 2232 includes a PO configuration component 2250 that is configured to obtain a plurality of configurations each indicating a PO for two-step random access, e.g., as described in connection with 1602. The communication manager 2232 includes a guard band configuration component 2252 that is configured to obtain a configuration indicating a guard band for a physical uplink shared channel (PUSCH) occasion (PO) for two-step random access, wherein the guard band is indicated in units of subcarriers spanning less than one physical resource block (PRB), e.g., as described in connection with 1702.

The apparatus may include additional components that perform each of the blocks of the algorithm in the aforementioned flowcharts of FIGS. 14-17. As such, each block in the aforementioned flowcharts of FIGS. 14-17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2202, and in particular the cellular baseband processor 2204, includes means for obtaining a random access channel (RACH) configuration, wherein the RACH configuration associates a preamble with at least one physical uplink shared channel (PUSCH) occasion (PO) for two-step random access, and wherein the PO spans a time interval greater than one slot. In one configuration, the apparatus 2202, and in particular the cellular baseband processor 2204, may include means for transmitting, or outputting for transmission, repetitions of the preamble in a plurality of RACH occasions (ROs). In one configuration, the apparatus 2202, and in particular the cellular baseband processor 2204, may include means for transmitting, or outputting for transmission, repetitions of PUSCH data in the at least one PO. In one configuration, the apparatus 2202, and in particular the cellular baseband processor 2204, may include means for transmitting, or outputting for transmission, a single transport block including PUSCH data in the at least one PO. In one configuration, the apparatus 2202, and in particular the cellular baseband processor 2204, may include means for switching an antenna between repetitions of PUSCH data in the at least one PO.

In one configuration, the apparatus 2202, and in particular the cellular baseband processor 2204, includes means for obtaining a random access channel (RACH) configuration, wherein the RACH configuration associates a preamble with a plurality of physical uplink shared channel (PUSCH) occasions (POs) for two-step random access. In one configuration, the apparatus 2202, and in particular the cellular baseband processor 2204, may include means for transmitting, or outputting for transmission, repetitions of the preamble in a plurality of RACH occasions (ROs). In one configuration, the apparatus 2202, and in particular the cellular baseband processor 2204, may include means for transmitting, or outputting for transmission, repetitions of PUSCH data in at least one of the plurality of POs. In one configuration, the apparatus 2202, and in particular the cellular baseband processor 2204, may include means for transmitting, or outputting for transmission, a single transport block including PUSCH data in the POs. In one configuration, the apparatus 2202, and in particular the cellular baseband processor 2204, may include means for switching an antenna between repetitions of PUSCH data in at least one of the plurality of POs.

In one configuration, the apparatus 2202, and in particular the cellular baseband processor 2204, includes means for obtaining a plurality of configurations each indicating a physical uplink shared channel (PUSCH) occasion (PO) for two-step random access.

In one configuration, the apparatus 2202, and in particular the cellular baseband processor 2204, includes means for obtaining a configuration indicating a guard band for a physical uplink shared channel (PUSCH) occasion (PO) for two-step random access, wherein the guard band is indicated in units of subcarriers spanning less than one physical resource block (PRB).

The aforementioned means may be one or more of the aforementioned components of the apparatus 2202 configured to perform the functions recited by the aforementioned means. As described supra, the apparatus 2202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 23:
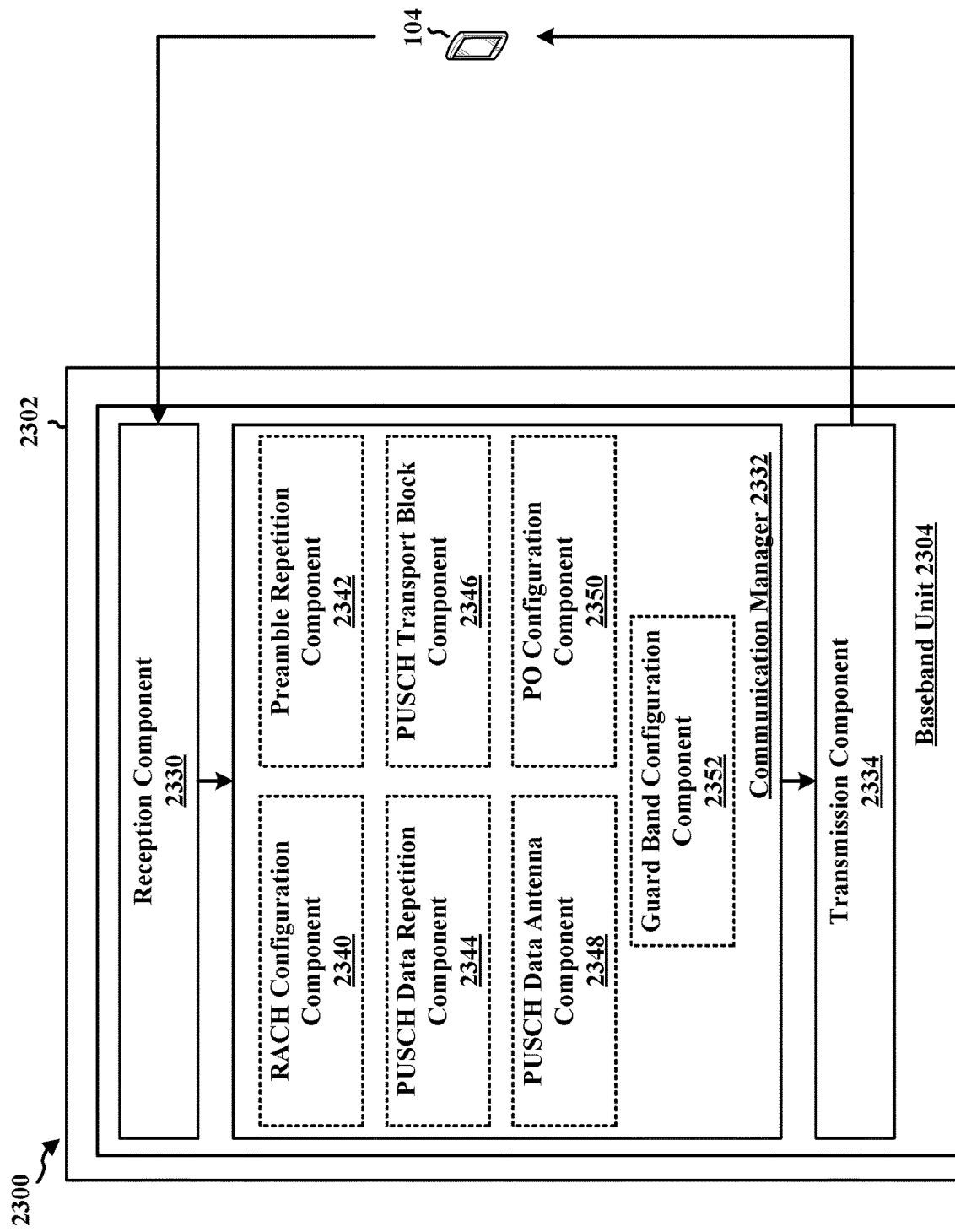
FIG. 23 is a diagram illustrating another example of a hardware implementation for another example apparatus.

FIG. 23 is a diagram 2300 illustrating an example of a hardware implementation for an apparatus 2302. The apparatus 2302 is a BS and includes a baseband unit 2304. The baseband unit 2304 may communicate through a cellular RF transceiver with the UE 104. The baseband unit 2304 may include a computer-readable medium/memory. The baseband unit 2304 is responsible for general processing, including the execution of software stored on the computer-readable medium/memory. The software, when executed by the baseband unit 2304, causes the baseband unit 2304 to perform the various functions described supra. The computer-readable medium/memory may also be used for storing data that is manipulated by the baseband unit 2304 when executing software. The baseband unit 2304 further includes a reception component 2330, a communication manager 2332, and a transmission component 2334. The communication manager 2332 includes the one or more illustrated components. The components within the communication manager 2332 may be stored in the computer-readable medium/memory and/or configured as hardware within the baseband unit 2304. The baseband unit 2304 may be a component of the BS 310 and may include the memory 376 and/or at least one of the TX processor 316, the RX processor 370, and the controller/processor 375.

The communication manager 2332 includes a RACH configuration component 2340 that is configured to provide, or output for transmission, a random access channel (RACH) configuration, wherein the RACH configuration associates a preamble with at least one physical uplink shared channel (PUSCH) occasion (PO) for two-step random access, and wherein the PO spans a time interval greater than one slot, e.g., as described in connection with 1802. The RACH configuration component 2340 may alternatively or additionally be configured to provide, or output for transmission, a random access channel (RACH) configuration, wherein the RACH configuration associates a preamble with a plurality of physical uplink shared channel (PUSCH) occasions (POs) for two-step random access, e.g., as described in connection with 1902. The communication manager 2332 includes a preamble repetition component 2342 that is configured to receive repetitions of the preamble in a plurality of ROs, e.g., as described in connection with 1804 and 1904. The communication manager 2332 includes a PUSCH data repetition component 2344 that is configured to receive repetitions of PUSCH data in the at least one PO, e.g., as described in connection with 1806 and 1906. The communication manager 2332 includes a PUSCH transport block component 2346 that is configured to receive a single transport block including PUSCH data in the at least one PO, e.g., as described in connection with 1808 and 1908. The communication manager 2332 includes a PUSCH data antenna component 2348 that is configured to receive repetitions of PUSCH data in the at least one PO from different antennas of a UE, e.g., as described in connection with 1810 and 1910. The communication manager 2332 includes a PO configuration component 2350 that is configured to provide, or output for transmission, a plurality of configurations each indicating a PO for two-step random access, e.g., as described in connection with 2002. The communication manager 2332 includes a guard band configuration component 2352 that is configured to provide, or output for transmission, a configuration indicating a guard band for a physical uplink shared channel (PUSCH) occasion (PO) for two-step random access, wherein the guard band is indicated in units of subcarriers spanning less than one physical resource block (PRB), e.g., as described in connection with 2102.

The apparatus may include additional components that perform each of the blocks of the algorithm in the aforementioned flowcharts of FIGS. 18-21. As such, each block in the aforementioned flowcharts of FIGS. 18-21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2302, and in particular the baseband unit 2304, includes means for providing a random access channel (RACH) configuration, wherein the RACH configuration associates a preamble with at least one physical uplink shared channel (PUSCH) occasion (PO) for two-step random access, and wherein the PO spans a time interval greater than one slot. In one configuration, the apparatus 2302, and in particular the baseband unit 2304, may include means for receiving or obtaining repetitions of the preamble in a plurality of RACH occasions (ROs). In one configuration, the apparatus 2302, and in particular the baseband unit 2304, may include means for receiving or obtaining repetitions of PUSCH data in the at least one PO. In one configuration, the apparatus 2302, and in particular the baseband unit 2304, may include means for receiving or obtaining a single transport block including PUSCH data in the at least one PO. In one configuration, the apparatus 2302, and in particular the baseband unit 2304, may include means for receiving or obtaining repetitions of PUSCH data in the at least one PO from different antennas of a UE.

In one configuration, the apparatus 2302, and in particular the baseband unit 2304, includes means for providing a random access channel (RACH) configuration, wherein the RACH configuration associates a preamble with a plurality of physical uplink shared channel (PUSCH) occasions (POs) for two-step random access. In one configuration, the apparatus 2302, and in particular the baseband unit 2304, may include means for receiving or obtaining repetitions of the preamble in a plurality of RACH occasions (ROs). In one configuration, the apparatus 2302, and in particular the baseband unit 2304, may include means for receiving or obtaining repetitions of PUSCH data in at least one of the plurality of POs. In one configuration, the apparatus 2302, and in particular the baseband unit 2304, may include means for receiving or obtaining a single transport block including PUSCH data in at least one of the plurality of POs. In one configuration, the apparatus 2302, and in particular the baseband unit 2304, may include means for receiving or obtaining repetitions of PUSCH data in at least one of the plurality of POs from different antennas of a UE.

In one configuration, the apparatus 2302, and in particular the baseband unit 2304, includes means for providing a plurality of configurations each indicating a physical uplink shared channel (PUSCH) occasion (PO) for two-step random access.

In one configuration, the apparatus 2302, and in particular the baseband unit 2304, includes means for providing a configuration indicating a guard band for a physical uplink shared channel (PUSCH) occasion (PO) for two-step random access, wherein the guard band is indicated in units of subcarriers spanning less than one physical resource block (PRB).

The aforementioned means may be one or more of the aforementioned components of the apparatus 2302 configured to perform the functions recited by the aforementioned means. As described supra, the apparatus 2302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method of wireless communication at a user equipment (UE), comprising: obtaining a random access channel (RACH) configuration, wherein the RACH configuration associates a preamble with at least one physical uplink shared channel (PUSCH) occasion (PO) for two-step random access, and wherein the PO spans a time interval greater than one slot.

Example 2 is the method of Example 1, wherein a starting frequency or a frequency span of the at least one PO changes across slots or symbols.

Example 3 is the method of any of Examples 1 and 2, wherein the at least one PO includes orthogonal demodulation reference signal (DMRS) patterns that do not overlap in time or in frequency, and are each associated with a different preamble.

Example 4 is the method of any of Examples 1 and 2, wherein the at least one PO includes non-orthogonal demodulation reference signal (DMRS) patterns that overlap in at least one of time or frequency, and are each associated with a different preamble.

Example 5 is the method of any of Examples 1 to 4, wherein the at least one PO includes demodulation reference signal (DMRS) patterns associated with orthogonal DMRS sequences and each associated with a different preamble.

Example 6 is the method of any of Examples 1 to 4, wherein the at least one PO includes demodulation reference signal (DMRS) patterns associated with non-orthogonal DMRS sequences and each associated with a different preamble.

Example 7 is the method of any of Examples 1 to 6, wherein the at least one PO includes repetitions of PUSCH data associated with different scrambling sequences.

Example 8 is the method of any of Examples 1 to 7, further comprising: transmitting repetitions of the preamble in a plurality of RACH occasions (ROs).

Example 9 is the method of any of Examples 1 to 8, further comprising: transmitting repetitions of PUSCH data in the at least one PO.

Example 10 is the method of Example 9, wherein the repetitions are associated with cycled redundancy versions.

Example 11 is the method of any of Examples 1 to 8, further comprising: transmitting a single transport block including PUSCH data in the at least one PO.

Example 12 is the method of any of Examples 1 to 11, wherein the at least one PO includes intra-slot frequency hopping or inter-slot frequency hopping.

Example 13 is the method of any of Examples 1 to 12, further comprising: switching an antenna between repetitions of PUSCH data in the at least one PO.

Example 14 is the method of any of Examples 1 to 13, wherein a plurality of demodulation reference signals (DMRSs) are bundled in the at least one PO.

Example 15 is a method of wireless communication at a user equipment (UE), comprising: obtaining a random access channel (RACH) configuration, wherein the RACH configuration associates a preamble with a plurality of physical uplink shared channel (PUSCH) occasions (POs) for two-step random access.

Example 16 is the method of Example 15, wherein each of the POs include a start time location, a time interval, a start frequency location, and a frequency interval.

Example 17 is the method of any of Examples 15 and 16, wherein one or more of the POs includes orthogonal demodulation reference signal (DMRS) patterns.

Example 18 is the method of any of Examples 15 and 16, wherein one or more of the POs includes non-orthogonal demodulation reference signal (DMRS) patterns.

Example 19 is the method of any of Examples 15 to 18, wherein one or more of the POs includes demodulation reference signal (DMRS) patterns associated with orthogonal DMRS sequences.

Example 20 is the method of any of Examples 15 to 18, wherein one or more of the POs includes demodulation reference signal (DMRS) patterns associated with non-orthogonal DMRS sequences.

Example 21 is the method of any of Examples 15 to 20, wherein one or more of the POs includes repetitions of PUSCH data associated with different scrambling sequences.

Example 22 is the method of any of Examples 15 to 21, further comprising: transmitting repetitions of the preamble in a plurality of RACH occasions (ROs).

Example 23 is the method of any of Examples 15 to 22, further comprising: transmitting repetitions of PUSCH data in the POs.

Example 24 is the method of Example 23, wherein the repetitions are associated with cycled redundancy versions.

Example 25 is the method of any of Examples 15 to 22, further comprising: transmitting a single transport block including PUSCH data in the POs.

Example 26 is the method of any of Examples 15 to 25, wherein one or more of the POs include intra-slot frequency hopping or inter-slot frequency hopping.

Example 27 is the method of any of Examples 15 to 26, further comprising: switching an antenna between repetitions of PUSCH data in the POs.

Example 28 is the method of any of Examples 15 to 27, wherein a plurality of demodulation reference signals (DMRSs) are bundled in the POs.

Example 29 is a method of wireless communication at a user equipment (UE), comprising: obtaining a plurality of configurations each indicating a physical uplink shared channel (PUSCH) occasion (PO) for two-step random access.

Example 30 is the method of Example 29, wherein the configurations are each associated with a different UE capability.

Example 31 is the method of Example 30, wherein the UE capability includes a global navigational satellite system (GNSS) capability or a UE type.

Example 32 is the method of any of Examples 29 to 31, wherein the configurations differ in guard time and guard band.

Example 33 is the method of any of Examples 29 to 32, wherein the configurations are specific to different preamble groups.

Example 34 is a method of wireless communication at a user equipment (UE), comprising: obtaining a configuration indicating a guard band for a physical uplink shared channel (PUSCH) occasion (PO) for two-step random access, wherein the guard band is indicated in units of subcarriers spanning less than one physical resource block (PRB).

Example 35 is a UE, comprising: a transceiver; a memory comprising instructions; and one or more processors configured to execute the instructions to cause the UE to perform a method in accordance with any one of examples 1-14, wherein the transceiver is configured to: receive the RACH configuration.

Example 36 is a UE, comprising: a transceiver; a memory comprising instructions; and one or more processors configured to execute the instructions to cause the UE to perform a method in accordance with any one of examples 15-28, wherein the transceiver is configured to: receive the RACH configuration.

Example 37 is a UE, comprising: a transceiver; a memory comprising instructions; and one or more processors configured to execute the instructions to cause the UE to perform a method in accordance with any one of examples 29-33, wherein the transceiver is configured to: receive the plurality of configurations.

Example 38 is a UE, comprising: a transceiver; a memory comprising instructions; and one or more processors configured to execute the instructions to cause the UE to perform a method in accordance with example 34, wherein the transceiver is configured to: receive the configuration indicating a guard band for the PO.

Example 39 is an apparatus for wireless communications, comprising means for performing a method in accordance with any one of examples 1-14.

Example 40 is an apparatus for wireless communications, comprising means for performing a method in accordance with any one of examples 15-28.

Example 41 is an apparatus for wireless communications, comprising means for performing a method in accordance with any one of examples 29-33.

Example 42 is an apparatus for wireless communications, comprising means for performing a method in accordance with example 34.

Example 43 is a non-transitory computer-readable medium comprising instructions that, when executed by an apparatus, cause the apparatus to perform a method in accordance with any one of examples 1-14.

Example 44 is a non-transitory computer-readable medium comprising instructions that, when executed by an apparatus, cause the apparatus to perform a method in accordance with any one of examples 15-28.

Example 45 is a non-transitory computer-readable medium comprising instructions that, when executed by an apparatus, cause the apparatus to perform a method in accordance with any one of examples 29-33.

Example 46 is a non-transitory computer-readable medium comprising instructions that, when executed by an apparatus, cause the apparatus to perform a method in accordance with example 34.

Example 47 is a method for wireless communications at a user equipment (UE), comprising: obtaining a random access channel (RACH) configuration, wherein the RACH configuration associates a preamble with at least one physical uplink shared channel (PUSCH) occasion (PO) for two-step random access, and wherein the PO spans a time interval greater than one slot; and outputting repetitions of PUSCH data for transmission in the at least one PO.

Example 48 is the method of Example 47, wherein a starting frequency or a frequency span of the at least one PO changes across slots or symbols.

Example 49 is the method of any of Examples 47 and 48, further comprising outputting for transmission repetitions of the preamble in a plurality of RACH occasions (ROs).

Example 50 is the method of any of Examples 47-49, further comprising outputting for transmission a single transport block including PUSCH data in the at least one PO.

Example 51 is the method of any of Examples 47-50, wherein the at least one PO includes intra-slot frequency hopping or inter-slot frequency hopping.

Example 52 is the method of any of Examples 47-51, wherein the RACH configuration is a first RACH configuration, wherein the preamble is a first preamble, and wherein the method further comprises obtaining a plurality of RACH configurations including the first RACH configuration and a second RACH configuration, wherein the second RACH configuration associates a second preamble with another PO for two-step random access.

Example 53 is the method of any of Examples 47-52, wherein the first RACH configuration is associated with a first UE capability and the second RACH configuration is associated with a second UE capability.

Example 54 is the method of any of Examples 47-53, wherein the first RACH configuration and the second RACH configuration differ in at least one of a guard time or a guard band, and wherein each of first RACH configuration and the second RACH configuration is specific to a different preamble group.

Example 55 is the method of any of Examples 47-54, wherein the RACH configuration indicates a guard band for the PO, and wherein the guard band is indicated in units of subcarriers spanning less than one physical resource block (PRB).

Example 56 is a method for wireless communications at a user equipment (UE), comprising: obtaining a random access channel (RACH) configuration, wherein the RACH configuration associates a preamble with a plurality of physical uplink shared channel (PUSCH) occasions (POs) for two-step random access; and outputting repetitions of PUSCH data for transmission in at least one of the plurality of POs.

Example 57 is the method of Examples 56, wherein each of the plurality of POs include at least one of a start time location, a time interval, a start frequency location, or a frequency interval.

Example 58 is the method of any of Examples 56 and 57, further comprising outputting repetitions of the preamble for transmission in a plurality of RACH occasions (ROs).

Example 59 is the method of any of Examples 56-58, further comprising outputting a single transport block including PUSCH data for transmission in at least one of the plurality of POs.

Example 60 is the method of any of Examples 56-59, wherein one or more of the plurality of POs includes intra-slot frequency hopping or inter-slot frequency hopping.

Example 61 is the method of any of Examples 56-60, wherein the RACH configuration is a first RACH configuration, wherein the preamble is a first preamble, and wherein the method further comprises obtaining a plurality of RACH configurations including the first RACH configuration and a second RACH configuration, wherein the second RACH configuration associates a second preamble with another plurality of POs for two-step random access.

Example 62 is the method of any of Examples 56-61, wherein the first RACH configuration is associated with a first UE capability and the second RACH configuration is associated with a second UE capability.

Example 63 is the method of any of Examples 56-62, wherein the first RACH configuration and the second RACH configuration differ in at least one of a guard time or a guard band, and wherein each of first RACH configuration and the second RACH configuration is specific to a different preamble group.

Example 64 is the method of any of Examples 56-63, wherein the RACH configuration indicates a guard band for each of the plurality of POs, and wherein the guard band is indicated in units of subcarriers spanning less than one physical resource block (PRB).

Example 65 is a method for wireless communications at a base station (BS), comprising: outputting a random access channel (RACH) configuration for transmission, wherein the RACH configuration associates a preamble with at least one physical uplink shared channel (PUSCH) occasion (PO) for two-step random access, and wherein the PO spans a time interval greater than one slot; and obtaining repetitions of PUSCH data in the at least one PO.

Example 66 is the method of Examples 65, further comprising obtaining repetitions of the preamble in a plurality of RACH occasions (ROs).

Example 67 is the method of any of Examples 65 and 66, wherein the RACH configuration is a first RACH configuration, wherein the preamble is a first preamble, and wherein the method further comprises obtaining a plurality of RACH configurations including the first RACH configuration and a second RACH configuration, wherein the second RACH configuration associates a second preamble with another PO for two-step random access.

Example 68 is the method of any of Examples 65-67, wherein the RACH configuration indicates a guard band for the PO, and wherein the guard band is indicated in units of subcarriers spanning less than one physical resource block (PRB).

Example 69 is method for wireless communications at a base station (BS), comprising: outputting a random access channel (RACH) configuration for transmission, wherein the RACH configuration associates a preamble with a plurality of physical uplink shared channel (PUSCH) occasions (POs) for two-step random access; and obtaining repetitions of PUSCH data in at least one of the plurality of POs.

Example 70 is the method of Examples 69, further comprising obtaining repetitions of the preamble in a plurality of RACH occasions (ROs).

Example 71 is the method of any of Examples 69 and 70, wherein the RACH configuration is a first RACH configuration, wherein the preamble is a first preamble, and wherein the method further comprises obtaining a plurality of RACH configurations including the first RACH configuration and a second RACH configuration, wherein the second RACH configuration associates a second preamble with another plurality of POs for two-step random access.

Example 72 is the method of any of Examples 69-71, wherein the RACH configuration indicates a guard band for each of the plurality of POs, and wherein the guard band is indicated in units of subcarriers spanning less than one physical resource block (PRB).

Example 73 is a UE, comprising: a transceiver; a memory comprising instructions; and one or more processors configured to execute the instructions to cause the UE to perform a method in accordance with any one of examples 47-55, wherein the transceiver is configured to: receive the RACH configuration; and transmit repetitions of PUSCH data in the at least one PO.

Example 74 is a UE, comprising: a transceiver; a memory comprising instructions; and one or more processors configured to execute the instructions to cause the UE to perform a method in accordance with any one of examples 56-64, wherein the transceiver is configured to: receive the RACH configuration; and transmit repetitions of PUSCH data in at least one of the plurality of POs.

Example 75 is a BS, comprising: a transceiver; a memory comprising instructions; and one or more processors configured to execute the instructions to cause the BS to perform a method in accordance with any one of examples 65-68, wherein the transceiver is configured to: transmit the RACH configuration; and receive repetitions of PUSCH data in the at least one PO.

Example 76 is a BS, comprising: a transceiver; a memory comprising instructions; and one or more processors configured to execute the instructions to cause the BS to perform a method in accordance with any one of examples 69-72, wherein the transceiver is configured to: transmit the RACH configuration; and receive repetitions of PUSCH data in at least one of the plurality of POs.

Example 77 is an apparatus for wireless communications, comprising means for performing a method in accordance with any one of examples 47-55.

Example 78 is an apparatus for wireless communications, comprising means for performing a method in accordance with any one of examples 56-64.

Example 79 is an apparatus for wireless communications, comprising means for performing a method in accordance with any one of examples 65-68.

Example 80 is an apparatus for wireless communications, comprising means for performing a method in accordance with any one of examples 69-72.

Example 81 is a non-transitory computer-readable medium comprising instructions that, when executed by an apparatus, cause the apparatus to perform a method in accordance with any one of examples 47-55.

Example 82 is a non-transitory computer-readable medium comprising instructions that, when executed by an apparatus, cause the apparatus to perform a method in accordance with any one of examples 56-64.

Example 83 is a non-transitory computer-readable medium comprising instructions that, when executed by an apparatus, cause the apparatus to perform a method in accordance with any one of examples 65-68.

Example 84 is a non-transitory computer-readable medium comprising instructions that, when executed by an apparatus, cause the apparatus to perform a method in accordance with any one of examples 69-72.

What is claimed is:

1. An apparatus for wireless communications, comprising:
memory comprising instructions; and
one or more processors configured to execute the instructions and cause the apparatus to:
obtain a random access channel (RACH) configuration, wherein the RACH configuration associates a preamble with at least one physical uplink shared channel (PUSCH) occasion (PO), wherein the at least one PO spans a time interval greater than one slot, wherein the RACH configuration indicates a guard band for the at least one PO, and wherein the guard band is indicated in units of subcarriers spanning less than one physical resource block (PRB); and
output repetitions of PUSCH data for transmission in the at least one PO.

2. The apparatus of claim 1, wherein a frequency span of the at least one PO changes across slots or symbols.

3. The apparatus of claim 1, wherein the one or more processors are further configured to cause the apparatus to output for transmission repetitions of the preamble in a plurality of RACH occasions (ROs).

4. The apparatus of claim 1, wherein the one or more processors are further configured to cause the apparatus to output for transmission, a single transport block including PUSCH data in the at least one PO.

5. The apparatus of claim 1, wherein the at least one PO includes intra-slot frequency hopping or inter-slot frequency hopping.

6. The apparatus of claim 1, wherein the RACH configuration is a first RACH configuration, wherein the preamble is a first preamble, and wherein the one or more processors are further configured to cause the apparatus to obtain a plurality of RACH configurations including the first RACH configuration and a second RACH configuration, wherein the second RACH configuration associates a second preamble with another PO.

7. The apparatus of claim 6, wherein the first RACH configuration is associated with a first UE capability and the second RACH configuration is associated with a second UE capability, and wherein the first UE capability and the second UE capability correspond to at least one of a global navigation satellite system (GNSS) capability of the UE, or a physical configuration of the UE.

8. The apparatus of claim 6, wherein the first RACH configuration and the second RACH configuration differ in at least one of a guard time or the guard band, and wherein each of first RACH configuration and the second RACH configuration is specific to a different preamble group.

9. The apparatus of claim 1, further comprising a transceiver configured to:
receive the RACH configuration; and
transmit the repetitions of the PUSCH data in the at least one PO, wherein the apparatus is configured as a user equipment (UE).

10. An apparatus for wireless communications, comprising:
a memory comprising instructions; and
one or more processors configured to execute the instructions and cause the apparatus to:
obtain a random access channel (RACH) configuration, wherein the RACH configuration associates a preamble with a plurality of physical uplink shared channel (PUSCH) occasions (POs), wherein the plurality of POs comprise a first PO and a second PO, wherein the RACH configuration indicates a guard band between the first PO and the second PO, and wherein the guard band is indicated in units of subcarriers spanning less than one physical resource block (PRB); and
output repetitions of PUSCH data for transmission in at least one of the plurality of POs.

11. The apparatus of claim 10, wherein each of the plurality of POs include at least one of a start time location, a time interval, a start frequency location, or a frequency interval.

12. The apparatus of claim 10, wherein the one or more processors are further configured to cause the apparatus to output repetitions of the preamble for transmission in a plurality of RACH occasions (ROs).

13. The apparatus of claim 10, wherein the one or more processors are further configured to cause the apparatus to output a single transport block including PUSCH data for transmission in at least one of the plurality of POs.

14. The apparatus of claim 10, wherein one or more of the plurality of POs includes intra-slot frequency hopping or inter-slot frequency hopping.

15. The apparatus of claim 10, wherein the RACH configuration is a first RACH configuration, wherein the preamble is a first preamble, and wherein the one or more processors are further configured to cause the apparatus to obtain a plurality of RACH configurations including the first RACH configuration and a second RACH configuration, wherein the second RACH configuration associates a second preamble with another plurality of POs.

16. The apparatus of claim 15, wherein the first RACH configuration is associated with a first UE capability and the second RACH configuration is associated with a second UE capability, and wherein the first UE capability and the second UE capability correspond to at least one of a global navigation satellite system (GNSS) capability of the UE, or a physical configuration of the UE.

17. The apparatus of claim 15, wherein the first RACH configuration and the second RACH configuration differ in at least one of a guard time or the guard band, and wherein each of first RACH configuration and the second RACH configuration is specific to a different preamble group.

18. The apparatus of claim 10, further comprising a transceiver configured to:
receive the RACH configuration; and
transmit the repetitions of the PUSCH data in at least one of the plurality of POs, wherein the apparatus is configured as a user equipment (UE).

19. An apparatus for wireless communications, comprising:
a memory comprising instructions; and
one or more processors configured to execute the instructions and cause the apparatus to:
output a random access channel (RACH) configuration for transmission, wherein the RACH configuration associates a preamble with at least one physical uplink shared channel (PUSCH) occasion (PO), wherein the at least one PO spans a time interval greater than one slot, wherein the RACH configuration indicates a guard band for the at least one PO, and wherein the guard band is indicated in units of subcarriers spanning less than one physical resource block (PRB); and
obtain repetitions of PUSCH data in the at least one PO.

20. The apparatus of claim 19, wherein the one or more processors further cause the apparatus to obtain repetitions of the preamble in a plurality of RACH occasions (ROs).

21. The apparatus of claim 19, wherein the RACH configuration is a first RACH configuration, wherein the preamble is a first preamble, and wherein the one or more processors are further configured to cause the apparatus to obtain a plurality of RACH configurations including the first RACH configuration and a second RACH configuration, wherein the second RACH configuration associates a second preamble with another PO.

22. The apparatus of claim 19, further comprising a transceiver configured to:
   transmit the RACH configuration; and
   receive the repetitions of the PUSCH data in the at least one PO, wherein the apparatus is configured as a base station (BS).

23. An apparatus for wireless communications, comprising:
   a memory comprising instructions; and
   one or more processors configured to execute the instructions and cause the apparatus to:
      output a random access channel (RACH) configuration for transmission, wherein the RACH configuration associates a preamble with a plurality of physical uplink shared channel (PUSCH) occasions (POs), wherein the plurality of POs comprise a first PO and a second PO, wherein the RACH configuration indicates a guard band between the first PO and the second PO, and wherein the guard band is indicated in units of subcarriers spanning less than one physical resource block (PRB); and
      obtain repetitions of PUSCH data in at least one of the plurality of POs.

24. The apparatus of claim 23, wherein the one or more processors further cause the apparatus to obtain repetitions of the preamble in a plurality of RACH occasions (ROs).

25. The apparatus of claim 23, wherein the RACH configuration is a first RACH configuration, wherein the preamble is a first preamble, and wherein the one or more processors are further configured to cause the apparatus to obtain a plurality of RACH configurations including the first RACH configuration and a second RACH configuration, wherein the second RACH configuration associates a second preamble with another plurality of POs.

26. The apparatus of claim 23, further comprising a transceiver configured to:
   transmit the RACH configuration; and
   receive the repetitions of the PUSCH data in the at least one of the plurality of POs, wherein the apparatus is configured as a base station (BS).

27. The apparatus of claim 19, wherein a frequency span of the at least one PO changes across slots or symbols.

28. The apparatus of claim 23, wherein a frequency span of the plurality of POs changes across slots or symbols.

* * * * *